(12) United States Patent
Yamamoto et al.

(10) Patent No.: US 9,263,744 B2
(45) Date of Patent: Feb. 16, 2016

(54) ACTIVE MATERIAL, ELECTRODE, SECONDARY BATTERY, BATTERY PACK, ELECTRIC VEHICLE, ELECTRIC POWER STORAGE SYSTEM, ELECTRIC POWER TOOL, AND ELECTRONIC APPARATUS

(71) Applicant: Sony Corporation, Tokyo (JP)

(72) Inventors: Kenta Yamamoto, Kanagawa (JP); Takayuki Ito, Kanagawa (JP); Takeshi Miyazaki, Kanagawa (JP); Hidetoshi Ito, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 215 days.

(21) Appl. No.: 14/058,993

(22) Filed: Oct. 21, 2013

(65) Prior Publication Data

US 2014/0129065 A1 May 8, 2014

(30) Foreign Application Priority Data

Nov. 8, 2012 (JP) ................................. 2012-245995

(51) Int. Cl.
| | | |
|---|---|---|
| H01M 4/485 | (2010.01) |
| B60L 1/06 | (2006.01) |
| B60L 11/12 | (2006.01) |
| B60L 11/14 | (2006.01) |
| B60L 11/18 | (2006.01) |
| H01M 4/505 | (2010.01) |
| H01M 4/525 | (2010.01) |
| C01G 19/00 | (2006.01) |
| C01G 53/00 | (2006.01) |
| H01M 10/052 | (2010.01) |

(52) U.S. Cl.
CPC ................ *H01M 4/485* (2013.01); *B60L 1/06* (2013.01); *B60L 11/123* (2013.01); *B60L 11/14* (2013.01); *B60L 11/184* (2013.01); *B60L 11/1816* (2013.01); *B60L 11/1842* (2013.01); *B60L 11/1844* (2013.01); *B60L 11/1846* (2013.01); *B60L 11/1848* (2013.01); *B60L 11/1864* (2013.01); *B60L 11/1875* (2013.01); *B60L 11/1879* (2013.01); *C01G 19/006* (2013.01); *C01G 53/42* (2013.01); *H01M 4/505* (2013.01); *H01M 4/525* (2013.01); *B60L 2210/40* (2013.01); *B60L 2240/545* (2013.01); *C01P 2002/32* (2013.01); *C01P 2002/70* (2013.01); *C01P 2006/40* (2013.01); *H01M 10/052* (2013.01); *H01M 2220/20* (2013.01); *Y02E 60/122* (2013.01); *Y02E 60/721* (2013.01); *Y02T 10/6217* (2013.01); *Y02T 10/7005* (2013.01); *Y02T 10/7011* (2013.01); *Y02T 10/7061* (2013.01); *Y02T 10/7077* (2013.01); *Y02T 10/7241* (2013.01); *Y02T 90/121* (2013.01); *Y02T 90/127* (2013.01); *Y02T 90/128* (2013.01); *Y02T 90/14* (2013.01); *Y02T 90/163* (2013.01); *Y02T 90/169* (2013.01); *Y04S 10/126* (2013.01); *Y04S 30/14* (2013.01)

(58) Field of Classification Search
CPC ... H01M 4/485; H01M 4/505; H01M 10/052; H01M 2220/20; Y02E 60/122; B60L 1/06
See application file for complete search history.

(56) References Cited

U.S. PATENT DOCUMENTS

2013/0009088 A1* 1/2013 Yao ...................... H01M 4/483
252/62.3 T

FOREIGN PATENT DOCUMENTS

| JP | 10-172568 | 6/1998 |
| JP | 11-071115 | 3/1999 |
| JP | 2002-110225 | 4/2002 |
| JP | 4503160 | 7/2010 |
| JP | 2012-059457 | 3/2012 |
| JP | 2012-099287 | 5/2012 |

OTHER PUBLICATIONS

Shinichiro et al., "Newly Developed SCiB(TM) High-Safety Rechargeable Battery" (11 pages).
Norio et al. "New SCiB(TM) High-Safety Rechargeable Battery for HEV Application" (12 pages).
Mukai et al., "Comparative study of Li[CrTi]O4, Li[Li1/3Ti5/3]O4 and Li1/2Fe1/2[Li1/2Fe1/2Ti]O4 in non-aqueous lithium cells," Journal of Power Sources, vol. 146, 2005, pp. 213-216. (4 pages).
Ohzuku et al., "Electrochemistry and Structural Chemistry of Li[CrTi]O4 (Fd3wm) in Nonaqueous Lithium Cells," Journal of The Electrochemical Society, vol. 147, No. 10, pp. 3592-3597, 2000. (6 pages).

*Primary Examiner* — Laura Weiner
(74) *Attorney, Agent, or Firm* — Hazuki International, LLC

(57) ABSTRACT

A secondary battery includes: a cathode; an anode; and an electrolytic solution. The anode includes a lithium composite oxide represented by following Formula (1), $$Li_w Zn_x Sn_y M_z O_4 \quad (1)$$

where M is one or more of Co, Mg, Ni, Ca, Al, Ti, V, Cr, Mn, Fe, Cu, and Ag; and w to z satisfy $0.3 \leq w \leq 1$, $0.3 \leq x \leq 1$, $0.8 \leq y \leq 1.2$, and $(w+x+y+z)=3$.

11 Claims, 7 Drawing Sheets

ACTIVE MATERIAL, ELECTRODE, SECONDARY BATTERY, BATTERY PACK, ELECTRIC VEHICLE, ELECTRIC POWER STORAGE SYSTEM, ELECTRIC POWER TOOL, AND ELECTRONIC APPARATUS

CROSS REFERENCES TO RELATED APPLICATIONS

The present application claims priority to Japanese Priority Patent Application JP 2012-245995 filed in the Japan Patent Office on Nov. 8, 2012, the entire content of which is hereby incorporated by reference.

BACKGROUND

The present application relates to an active material including a lithium composite oxide, to an electrode and a secondary battery that use the active material, and to a battery pack, an electric vehicle, an electric power storage system, an electric power tool, and an electronic apparatus that use the secondary battery.

In recent years, various electronic apparatuses such as a mobile phone and a personal digital assistant (PDA) have been widely used, and it has been demanded to further reduce the size and the weight of the electronic apparatuses and to achieve their long life. Accordingly, as an electric power source for the electronic apparatuses, a battery, in particular, a small and light-weight secondary battery capable of providing high energy density has been developed.

In these days, it has been considered to apply such a secondary battery to various other applications in addition to the foregoing electronic apparatuses. Examples of such other applications may include a battery pack attachably and detachably mounted on the electronic apparatuses or the like, an electric vehicle such as an electric automobile, an electric power storage system such as a home electric power server, and an electric power tool such as an electric drill.

Secondary batteries utilizing various charge-discharge principles to obtain a battery capacity have been proposed. In particular, a secondary battery obtaining a battery capacity with the use of insertion and extraction of an electrode reactant has attracted attention, since such a secondary battery provides higher energy density than lead batteries, nickel-cadmium batteries, and the like.

The secondary battery includes electrodes (a cathode and an anode) and an electrolytic solution. The cathode contains an active material (cathode active material) that inserts and extracts an electrode reactant. The anode contains an active material (anode active material) that inserts and extracts the electrode reactant. As the anode active material, a carbon material such as graphite has been widely used.

In order to apply the secondary battery to a large-size application such as the foregoing electric vehicle, it is necessary to increase size of a secondary battery as an electric power source, that is, it is necessary to use a secondary battery capable of producing high energy. Accordingly, as performance necessary for the secondary battery, safety capable of suppressing occurrence of defects such as ignitions is important in addition to capacity characteristics capable of obtaining a high battery capacity.

Therefore, in order to improve safety and the like, various studies have been heretofore made on configurations of secondary batteries. Specifically, it has been proposed to use a lithium composite oxide containing titanium (Ti) as a main component, more specifically, to use lithium titanate ($Li_4Ti_5O_{12}$) as an anode active material (for example, see "Newly developed SCiB high-safety rechargeable battery," Shinichiro Kosugi et al., Toshiba Review, Vol. 63, No. 2, pp. 54-57, 2008; and "New SCiB high-safety rechargeable battery for HEV application," Norio Takami et al., Toshiba Review, Vol. 63, No. 12, pp. 54-57, 2008).

Charge-discharge electric potential of such $Li_4Ti_5O_{12}$, that is, electric potential at which insertion and extraction of lithium (Li) as an electrode reactant occur is about 1.5 V based on electric potential at which precipitation and dissolution of lithium occur as a standard. Therefore, the charge-discharge electric potential of $Li_4Ti_5O_{12}$ is significantly higher than general charge-discharge electric potential (from about 0.1 V to about 0.2 V both inclusive) of a carbon material such as graphite. In this case, in the case where $Li_4Ti_5O_{12}$ is used as an anode active material, lithium metal is less likely to be precipitated on the surface of an anode at the time of charge. Thereby, internal short-circuit resulting from precipitation of the lithium metal is less likely to be generated, and accordingly, defects such as ignitions are less likely to occur. As a result, high safety is obtained thereby.

However, the charge-discharge electric potential of $Li_4Ti_5O_{12}$ is excessively high. Therefore, while safety is improved, energy density as one of important factors determining a battery capacity is largely decreased. Therefore, in order to decrease the charge-discharge electric potential of $Li_4Ti_5O_{12}$ in the range capable of securing safety, it has been proposed to substitute chromium (Cr) for part of $Li_4Ti_5O_{12}$ (for example, see "Electrochemistry and Structural Chemistry of Li[CrTi]O$_4$ (Fd3m) in Nonaqueous Lithium Cells," Tsutomu Ohzuku et al., Journal of the Electrochemical Society, 147 (10), pp. 3592-3597, 2000; and "Comparative study of Li[CrTi]O$_4$, Li[Li$_{1/3}$Ti$_{5/3}$]O$_4$, and Li$_{1/2}$Fe$_{1/2}$[Li$_{1/2}$Fe$_{1/2}$Ti]O$_4$ in non-aqueous lithium cells," Kazuhiko Mukaia et al., Journal of Power Sources, 146, pp. 213-216, 2005). Thereby, the charge-discharge electric potential is decreased by about 0.05 V.

As a lithium composite oxide, in addition to the compound containing Ti as a main component, a compound containing other transition metal such as manganese (Mn) as a main component has been proposed (for example, see Japanese Unexamined Patent Application Publication Nos. H10-172568, H11-071115, 2002-110225, 2012-099287, and 2012-059457, and Japanese Patent No. 4503160).

SUMMARY

In order to obtain a high battery capacity while securing safety, an anode active material having charge-discharge electric potential that is sufficiently lower than charge-discharge electric potential of a lithium composite oxide such as $Li_4Ti_5O_{12}$ and that is sufficiently higher than charge-discharge electric potential of a carbon material such as graphite is necessitated. However, under existing conditions, even if part of $Li_4Ti_5O_{12}$ is substituted by Cr, the charge-discharge electric potential is decreased by only about 0.05 V. Therefore, there is room for improvement.

It is desirable to provide an active material, an electrode, a secondary battery, a battery pack, an electric vehicle, an electric power storage system, an electric power tool, and an electronic apparatus that are capable of achieving both capacity characteristics and safety.

According to an embodiment of the present application, there is provided an active material including a lithium composite oxide represented by following Formula (1), $$Li_wZn_xSn_yM_zO_4 \tag{1}$$

where M is one or more of Co, Mg, Ni, Ca, Al, Ti, V, Cr, Mn, Fe, Cu, and Ag; and w to z satisfy $0.3 \leq w \leq 1$, $0.3 \leq x \leq 1$, $0.8 \leq y \leq 1.2$, and $(w+x+y+z)=3$.

According to an embodiment of the present application, there is provided an electrode including a lithium composite oxide represented by following Formula (1), $$Li_w Zn_x Sn_y M_z O_4 \quad (1)$$

where M is one or more of Co, Mg, Ni, Ca, Al, Ti, V, Cr, Mn, Fe, Cu, and Ag; and w to z satisfy $0.3 \leq w \leq 1$, $0.3 \leq x \leq 1$, $0.8 \leq y \leq 1.2$, and $(w+x+y+z)=3$.

According to an embodiment of the present application, there is provided a secondary battery including: a cathode; an anode; and an electrolytic solution. The anode includes a lithium composite oxide represented by following Formula (1), $$Li_w Zn_x Sn_y M_z O_4 \quad (1)$$

where M is one or more of Co, Mg, Ni, Ca, Al, Ti, V, Cr, Mn, Fe, Cu, and Ag; and w to z satisfy $0.3 \leq w \leq 1$, $0.3 \leq x \leq 1$, $0.8 \leq y \leq 1.2$, and $(w+x+y+z)=3$.

According to an embodiment of the present application, there is provided a battery pack including: a secondary battery; a control section configured to control operation of the secondary battery; and a switch section configured to switch the operation of the secondary battery according to an instruction of the control section. The secondary battery includes a cathode, an anode, and an electrolytic solution. The anode includes a lithium composite oxide represented by following Formula (1), $$Li_w Zn_x Sn_y M_z O_4 \quad (1)$$

where M is one or more of Co, Mg, Ni, Ca, Al, Ti, V, Cr, Mn, Fe, Cu, and Ag; and w to z satisfy $0.3 \leq w \leq 1$, $0.3 \leq x \leq 1$, $0.8 \leq y \leq 1.2$, and $(w+x+y+z)=3$.

According to an embodiment of the present application, there is provided an electric vehicle including: a secondary battery; a conversion section configured to convert electric power supplied from the secondary battery into drive power; a drive section configured to operate according to the drive power; and a control section configured to control operation of the secondary battery. The secondary battery includes a cathode, an anode, and an electrolytic solution. The anode includes a lithium composite oxide represented by following Formula (1), $$Li_w Zn_x Sn_y M_z O_4 \quad (1)$$

where M is one or more of Co, Mg, Ni, Ca, Al, Ti, V, Cr, Mn, Fe, Cu, and Ag; and w to z satisfy $0.3 \leq w \leq 1$, $0.3 \leq x \leq 1$, $0.8 \leq y \leq 1.2$, and $(w+x+y+z)=3$.

According to an embodiment of the present application, there is provided an electric power storage system including: a secondary battery; one or more electric devices configured to be supplied with electric power from the secondary battery; and a control section configured to control the supplying of the electric power from the secondary battery to the one or more electric devices. The secondary battery includes a cathode, an anode, and an electrolytic solution. The anode includes a lithium composite oxide represented by following Formula (1), $$Li_w Zn_x Sn_y M_z O_4 \quad (1)$$

where M is one or more of Co, Mg, Ni, Ca, Al, Ti, V, Cr, Mn, Fe, Cu, and Ag; and w to z satisfy $0.3 \leq w \leq 1$, $0.3 \leq x \leq 1$, $0.8 \leq y \leq 1.2$, and $(w+x+y+z)=3$.

According to an embodiment of the present application, there is provided an electric power tool including: a secondary battery; and a movable section configured to be supplied with electric power from the secondary battery. The secondary battery includes a cathode, an anode, and an electrolytic solution. The anode includes a lithium composite oxide represented by following Formula (1), $$Li_w Zn_x Sn_y M_z O_4 \quad (1)$$

where M is one or more of Co, Mg, Ni, Ca, Al, Ti, V, Cr, Mn, Fe, Cu, and Ag; and w to z satisfy $0.3 \leq w \leq 1$, $0.3 \leq x \leq 1$, $0.8 \leq y \leq 1.2$, and $(w+x+y+z)=3$.

According to an embodiment of the present application, there is provided an electronic apparatus including a secondary battery as an electric power supply source. The secondary battery includes a cathode, an anode, and an electrolytic solution. The anode includes a lithium composite oxide represented by following Formula (1), $$Li_w Zn_x Sn_y M_z O_4 \quad (1)$$

where M is one or more of Co, Mg, Ni, Ca, Al, Ti, V, Cr, Mn, Fe, Cu, and Ag; and w to z satisfy $0.3 \leq w \leq 1$, $0.3 \leq x \leq 1$, $0.8 \leq y \leq 1.2$, and $(w+x+y+z)=3$.

According to the active material, the electrode, and the secondary battery according to the above-described embodiments of the present application, since the lithium composite oxide has a composition represented by Formula (1), both capacity characteristics and safety are achievable. Further, according to the battery pack, the electric vehicle, the electric power storage system, the electric power tool, and the electronic apparatus according to the above-described embodiments of the present application, similar effects are obtainable.

It is to be understood that both the foregoing general description and the following detailed description are exemplary, and are intended to provide further explanation of the technology as claimed.

Additional features and advantages are described herein, and will be apparent from the following Detailed Description and the figures.

BRIEF DESCRIPTION OF THE FIGURES

The accompanying drawings are included to provide a further understanding of the disclosure, and are incorporated in and constitute a part of this specification. The drawings illustrate embodiments and, together with the specification, serve to explain the principles of the technology.

DETAILED DESCRIPTION

Figure 1:
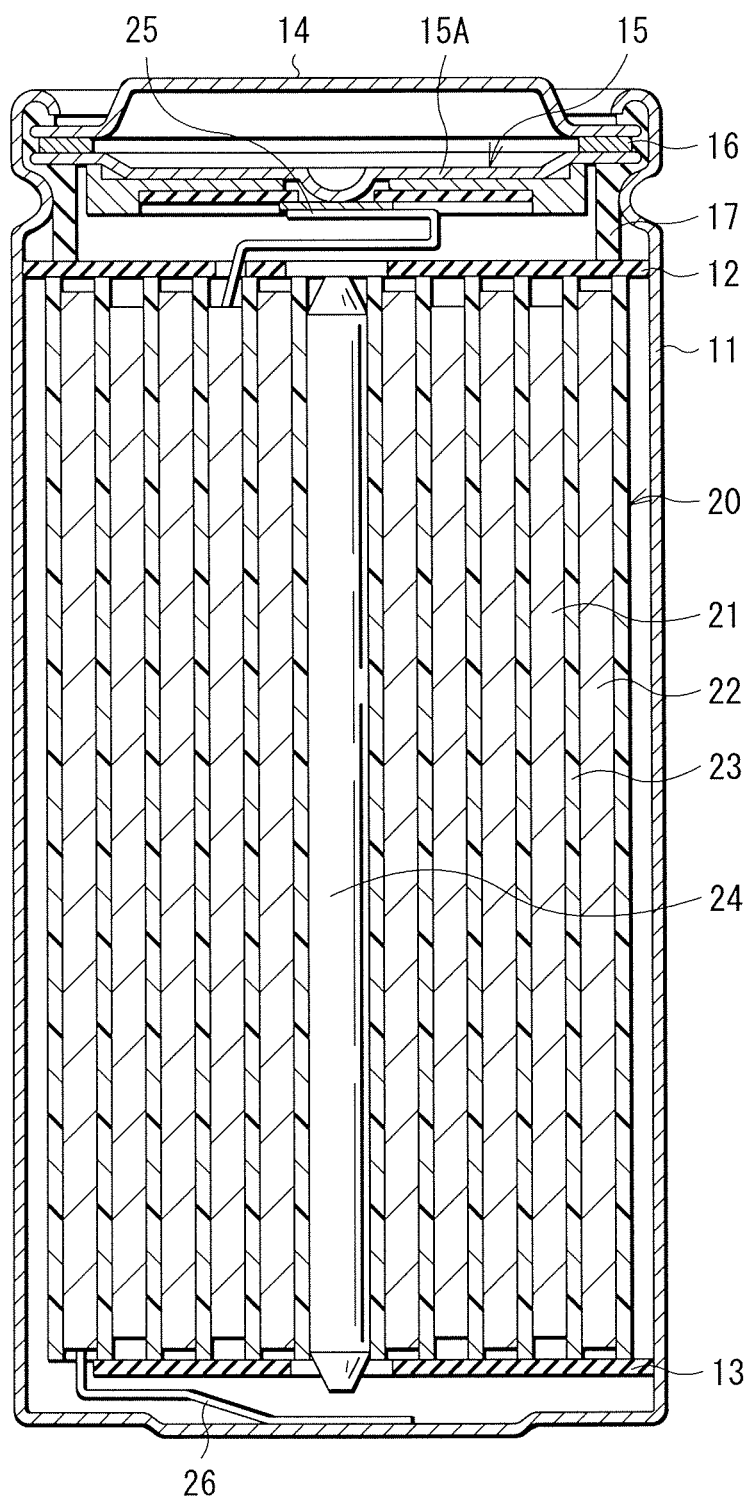
FIG. 1 is a cross-sectional view illustrating configurations of an electrode and a secondary battery (cylindrical type) that use an active material according to an embodiment of the present application.

An embodiment of the present application will be described below in detail with reference to the drawings. The description will be given in the following order.

1. Active Material
2. Application Examples of Active Material
2-1. Electrode and Secondary Battery (Cylindrical-Type Lithium Ion Secondary Battery)
2-2. Electrode and Secondary Battery (Laminated-Film-Type Lithium Ion Secondary Battery)
3. Applications of Secondary Battery
3-1. Battery Pack
3-2. Electric Vehicle
3-3. Electric Power Storage System
3-4. Electric Power Tool

[1. Active Material]

An active material according to an embodiment of the present application (simply referred to as "active material" below as well) is used as an electrode of a secondary battery. The secondary battery may be, for example, a lithium ion secondary battery or the like. However, the active material described here may be used as a cathode, and may be used as an anode.

[Configuration of Active Material]

The active material contains one or more of lithium composite oxides. Each of the lithium composite oxides has a composition represented by the following Formula (1).

$$Li_wZn_xSn_yM_zO_4 \quad (1)$$

In Formula I, M is one or more of Co, Mg, Ni, Ca, Al, Ti, V, Cr, Mn, Fe, Cu, and Ag; and w to z satisfy $0.3 \leq w \leq 1$, $0.3 \leq x \leq 1$, $0.8 \leq y \leq 1.2$, and $(w+x+y+z)=3$.

The lithium composite oxide represented by Formula (1) is an oxide containing lithium (Li), zinc (Zn), tin (Sn), and oxygen (O) as constituent elements, and has a spinel-type crystal structure as seen in the composition represented by such Formula (1). However, the lithium composite oxide may further contain other element (M).

One reason why the lithium composite oxide has a spinel-type crystal structure is that, in this case, the crystal structure is stabilized at the time of electrode reaction (at the time of charge and discharge), compared to in a case in which the lithium composite oxide has other type of crystal structure such as a bedded-salt-type crystal structure. Thereby, even if charge and discharge are repeated, the crystal structure is less likely to be broken. Therefore, lowering a battery capacity (discharge capacity) is suppressed, and gas release resulting from break of the crystal structure and/or the like is suppressed. The gas may be, for example, oxygen ($O_2$) or the like.

Further, one reason why abundances (molar ratios w to z) of the respective constitutional elements satisfy the foregoing conditions is that, in this case, while the spinel-type crystal structure is allowed to be formed, high energy density is retained, and charge-discharge electric potential is sufficiently decreased. More specifically, in the case of $x<0.3$ and $y<0.8$, the respective abundances of Zn and Sn are excessively small, and therefore, the spinel-type crystal structure is less likely to be formed, and the charge-discharge electric potential is not sufficiently decreased. In the case of $x>1$, the abundance of Zn that does not substantially contribute to a charge-discharge reaction is excessively large, and therefore, the charge-discharge electric potential is further decreased while the energy density is decreased. In the case of $y>1.2$, the abundance of Sn is excessively large, and therefore, the energy density is further increased while the charge-discharge electric potential is not sufficiently decreased.

Types of M are not particularly limited as long as M is one or more of Co, Mg, Ni, Ca, Al, Ti, V, Cr, Mn, Fe, Cu, and Ag as described above. One reason for this is that the foregoing advantages are obtainable without depending on the types of M. In particular, M may be preferably one or more of Co, Mg, and Ni, since a higher effect is obtained thereby.

Further, the abundance (the molar ratio z) of M is not particularly limited as long as the abundance of M is a value set in the range satisfying $(w+x+y+z)=3$. One reason for this is that the foregoing advantages are obtainable without depending on the abundance of M. Out of the prospective elements of M, abundance of Mg or the like that does not substantially contribute to a charge-discharge reaction may be preferably small as long as possible in the range where a large influence is not exercised on formation of the spinel-type crystal structure, securement of the energy density, lowering of the charge-discharge electric potential, and the like. Specifically, the molar ratio z may preferably satisfy $z \leq 1.6$.

[Specific Configuration of Active Material]

A specific composition of the lithium composite oxide is not particularly limited as long as the conditions shown in Formula (1) are satisfied.

In particular, the lithium composite oxide may preferably have a composition represented by the following Formula (2). One reason for this is that, in this case, the spinel-type crystal structure is easily formed, and charge-discharge electric potential is sufficiently decreased, and therefore, high energy density is obtained, and unintentional precipitation of lithium metal at the time of charge and discharge is suppressed.

$$Li_aCo_bMg_cZn_dNi_eSn_fX_gO_4 \quad (2)$$

In Formula (2), X is one or more of Ca, Al, Ti, V, Cr, Mn, Fe, Cu, and Ag; and a to g satisfy $0.3 \leq a \leq 1$, $0 \leq b \leq 1$, $0 \leq c \leq 1$, $0.3 \leq d \leq 1$, $0 \leq e \leq 1$, $0.8 \leq f \leq 1.2$, $0 \leq g \leq 0.05$, $(a+b+c+d+e+f+g)=3$, and $(c+d+g) \leq 1.3$.

The lithium composite oxide represented by Formula (2) is a composite oxide containing cobalt (Co), magnesium (Mg), and nickel (Ni) as constituent elements in addition to the foregoing Li, Zn, Sn, and O, and has a spinel-type crystal structure. However, the lithium composite oxide may further contain other element (X).

As seen in the possible value ranges of abundances (molar ratios a to g) of the respective constitutional elements, while Li, Zn, and Sn are necessary constitutional elements, Co, Mg, Ni, and X are arbitrary constitutional elements. That is, Li, Zn, and Sn as necessary constitutional elements are inevitably contained in the lithium composite oxide, while Co, Mg, Ni, and X as arbitrary constitutional elements may be contained in the lithium composite oxide, and are not necessarily contained in the lithium composite oxide.

One reason why d and f satisfy the foregoing conditions is similar to the reason described for x and y of Formula (1). One reason why a to g satisfy $(a+b+c+d+e+f+g)=3$ is similar to the reason described for w to z of Formula (1).

One reason why b, c, and e satisfy the foregoing conditions is as follows. In the case of $b>1$, $c>1$, and $e>1$, the respective abundances of Co, Mg, and Ni are excessively large, and therefore, a compound having an unintentional crystal structure (a crystal structure other than the spinel type) is obtained in a step of synthesizing the lithium composite oxide. As a result, energy density is decreased, and charge-discharge electric potential is not sufficiently decreased. One reason why g satisfies the foregoing conditions is as follows. In the case of g>0.05, the abundance of X that does not substantially contribute to a charge-discharge reaction is excessively large, and therefore, energy density may be decreased.

One reason why c, d, and g satisfy (c+d+g)≤1.3 is as follows. In the case of (c+d+g)>1.3, the total of the respective abundances of Mg, Zn, and X are excessively large, and therefore, a compound having an unintentional crystal structure (a crystal structure other than the spinel type) is obtained in a step of synthesizing the lithium composite oxide. As a result, energy density may be decreased, and charge-discharge electric potential is not sufficiently decreased.

Types of X are not particularly limited as long as X is one or more of the foregoing Ca, Al, Ti, V, Cr, Mn, Fe, Cu, and Ag. One reason for this is that the foregoing advantages are obtainable without depending on the types of X.

In particular, the lithium composite oxide represented by Formula (2) may preferably have a composition represented by the following Formula (3).

$$Li_aCo_bMg_cZn_dNi_eSn_fO_4 \quad (3)$$

In Formula (3), a to f satisfy $0.3 \leq a \leq 1$, $0 \leq b \leq 1$, $0 \leq c \leq 1$, $0.3 \leq d \leq 1$, $0 \leq e \leq 1$, $0.8 \leq f \leq 1.2$, $(a+b+c+d+e+f)=3$, and $(c+d) \leq 1.3$.

The lithium composite oxide represented by Formula (3) has a composition similar to that of the lithium composite oxide represented by Formula (2), except that the lithium composite oxide represented by Formula (3) does not contain other element (X) as a constitutional element. In particular, since the lithium composite oxide represented by Formula (3) does not contain other element (X) that does not substantially contribute to a charge-discharge reaction, higher energy density is obtained.

It is to be noted that, for more specific compositions of the lithium composite oxide, a description will be given in Examples described later.

[Analytical Method of Active Material]

For examining the composition of the active material, the lithium composite oxide is analyzed with the use of various element analytical methods, and thereby, types of constitutional elements and values of molar ratios w to z and a to g may be identified. Examples of the element analytical methods may include one or more of an X-ray diffraction (XRD) method, a time-of-flight secondary ion mass spectrometry (TOF-SIMS) method, a high-frequency induction coupled plasma (ICP) emission spectrometry method, a Raman spectrometric method, and an energy dispersive X-ray spectrometric method (EDX).

Further, for examining crystal structure type of the active material, the lithium composite oxide may be analyzed with the use of various crystal analytical methods. Examples of the crystal analytical methods may include one or more of an X-ray diffraction (XRD) method and the like. In the case of using the XRD method, for example, a pattern (diffraction pattern) of a measured diffraction peak of a known reference material having a spinel-type crystal structure may be previously examined. After the lithium composite oxide is analyzed with the use of the XRD method, the diffraction pattern as the analytical result is compared to the diffraction pattern of the foregoing reference material. Thereby, it is possible to determine whether or not the crystal structure of the lithium composite oxide is spinel type.

It is to be noted that in a region where charge and discharge are substantially performed in a secondary battery (in a region where a cathode is opposed to an anode), a composition of an active material may be changed due to a charge-discharge reaction. Therefore, even if the composition of the active material is examined after charge and discharge with the use of one or more of the foregoing element analytical methods, it is possible that the initial composition (composition before charge and discharge) is not allowed to be accurately checked. However, in the case where a region where charge and discharge are not performed (in a non-charge-discharge region) exists in the anode, the composition may be preferably examined in the non-charge-discharge region. In the non-charge-discharge region, a state before charge and discharge is substantially retained, and therefore, the composition is allowed to be checked subsequently without relation to presence or absence of charge and discharge. In the non-charge-discharge region, for example, for the purpose of securing safety, an insulating protective tape may be attached to an end surface of the anode (anode active material layer). Therefore, the non-charge-discharge region is a region where charge and discharge are not allowed to be performed due to existence of the protective tape. Further, for example, since the anode may be formed in a range wider than a range where the cathode is formed, the non-charge-discharge region is a region where the anode (anode active material layer) is not opposed to the cathode (cathode active material layer). As described above, analysis may be preferably made in the non-charge-discharge region. The same is applicable to a case of examining a crystal structure.

[Method of Manufacturing Active Material]

The active material may be manufactured, for example, by the following procedure.

In the case of manufacturing the active material, first, as raw materials, that is, as supply sources of the respective constitutional elements of the lithium composite oxide, two or more compounds are prepared. Each of raw materials may contain only one constitutional element of the constitutional elements of the lithium composite oxide, or may contain two or more constitutional elements thereof. Although types of the raw materials are not particularly limited, examples thereof may include one or more of an oxide, a hydroxide, a carbonate, a hydrosulfate, and a nitrate salt.

Subsequently, the raw materials are mixed. In this case, mixture ratio of the raw materials is adjusted so that a lithium composite oxide having a desired composition is obtained (abundances (molar ratios) of the respective constitutional elements of the lithium composite oxide have a desired relation with one another).

Subsequently, the mixture of the raw materials is fired. Conditions such as firing temperature and firing time are allowed to be arbitrarily set. Thereby, the lithium composite oxide is synthesized, and the active material is obtained.

[Function and Effect of Active Material]

According to the active material, the lithium composite oxide has the composition represented by Formula (1). In this case, as described above, the lithium composite oxide has the spinel-type crystal structure, and the charge-discharge electric potential is sufficiently decreased. Therefore, high energy density is obtained, and unintentional precipitation of lithium metal at the time of charge and discharge is suppressed. Therefore, in a secondary battery using the active material, a high battery capacity is obtained, and defects such as ignitions due to precipitation of lithium metal are less likely to occur. Accordingly, both capacity characteristics and safety are achievable.

In particular, in the case where the lithium composite oxide has the composition represented by Formula (1) or the composition represented by Formula (2), higher effects are obtainable.

[2. Application Examples of Active Material]

Next, a description will be given of application examples of the foregoing active material. The active material is used for an electrode and a secondary battery as follows.

[2-1. Electrode and Secondary Battery (Cylindrical-Type Lithium Ion Secondary Battery)]

Figure 2:
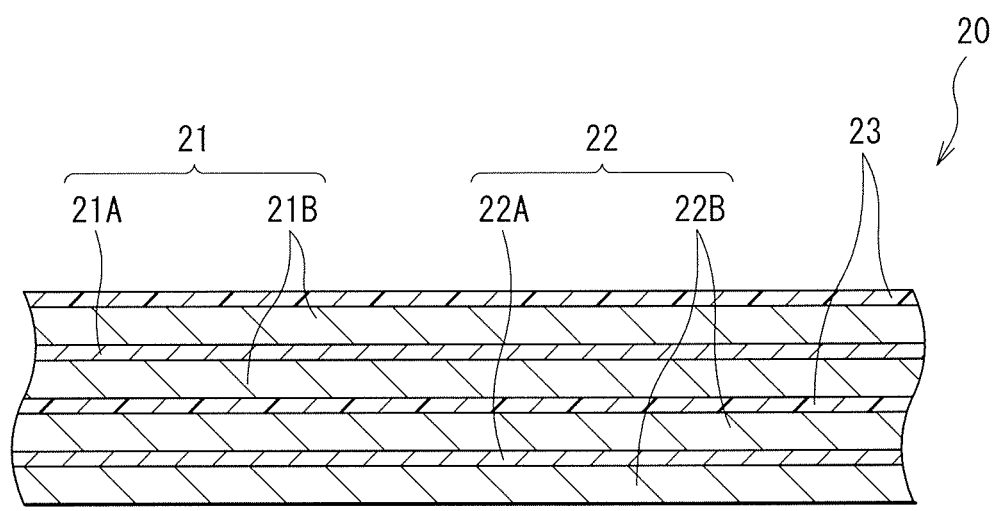
FIG. 2 is a cross-sectional view illustrating an enlarged part of a spirally wound electrode body illustrated in FIG. 1.

FIG. 1 and FIG. 2 illustrate cross-sectional configurations of a secondary battery. FIG. 2 illustrates enlarged part of a spirally wound electrode body 20 illustrated in FIG. 1. In this example, the electrode is applied to an anode 22, for example.

[Whole Configuration of Secondary Battery]

The secondary battery described here is a lithium ion secondary battery in which a capacity of the anode 22 is obtained by insertion and extraction of lithium (lithium ions) as an electrode reactant, and is a so-called cylindrical-type secondary battery.

For example, as illustrated in FIG. 1, the secondary battery may contain a pair of insulating plates 12 and 13 and a spirally wound electrode body 20 inside a battery can 11 in the shape of a substantially-hollow cylinder. In the spirally wound electrode body 20, for example, a cathode 21 and the anode 22 are layered with a separator 23 in between and are spirally wound.

For example, the battery can 11 may have a hollow structure in which one end of the battery can 11 is closed and the other end of the battery can 11 is opened. The battery can 11 may be made of, for example, one or more of iron, aluminum, an alloy thereof, and the like. The surface of the battery can 11 may be plated with nickel or the like. The pair of insulating plates 12 and 13 is arranged to sandwich the spirally wound electrode body 20 in between, and to extend perpendicularly to the spirally wound periphery surface of the spirally wound electrode body 20.

At the open end of the battery can 11, a battery cover 14, a safety valve mechanism 15, and a positive temperature coefficient device (PTC device) 16 are attached by being swaged with a gasket 17. Thereby, the battery can 11 is hermetically sealed. The battery cover 14 may be made of, for example, a material similar to that of the battery can 11. The safety valve mechanism 15 and the PTC device 16 are provided inside the battery cover 14. The safety valve mechanism 15 is electrically connected to the battery cover 14 through the PTC device 16. In the safety valve mechanism 15, in the case where the internal pressure becomes a certain level or more by internal short circuit, external heating, or the like, a disk plate 15A inverts to cut electric connection between the battery cover 14 and the spirally wound electrode body 20. The PTC device 16 prevents abnormal heat generation resulting from a large current. As temperature rises, resistance of the PTC device 16 is increased accordingly. The gasket 17 may be made of, for example, an insulating material. The surface of the gasket 17 may be coated with asphalt.

In the center of the spirally wound electrode body 20, for example, a center pin 24 may be inserted. For example, a cathode lead 25 made of a conductive material such as aluminum may be connected to the cathode 21. For example, an anode lead 26 made of a conductive material such as nickel may be connected to the anode 22. For example, the cathode lead 25 may be attached to the safety valve mechanism 15 by welding, and may be electrically connected to the battery cover 14. For example, the anode lead 26 may be attached to the battery can 11 by welding, and may be electrically connected to the battery can 11.

[Cathode]

As illustrated in FIG. 2, the cathode 21 has a cathode active material layer 21B on a single surface or both surfaces of a cathode current collector 21A. The cathode current collector 21A may be made of, for example, one or more of conductive materials such as aluminum, nickel, and stainless steel.

The cathode active material layer 21B contains, as cathode active materials, one or more of cathode materials capable of inserting and extracting lithium. The cathode active material layer 21B may further contain one or more of other materials such as a cathode binder and a cathode electric conductor.

The cathode material may be preferably one or more of lithium-containing compounds, since high energy density is obtained thereby. Examples of the lithium-containing compound may include a lithium-transition-metal composite oxide and a lithium-transition-metal-phosphate compound. The lithium-transition-metal composite oxide is an oxide containing lithium and one or more transition metal elements as constituent elements. The lithium-transition-metal-phosphate compound is a phosphate compound containing lithium and one or more transition metal elements as constituent elements. In particular, it may be preferable that the transition metal element be one or more of Co, Ni, Mn, Fe, and the like, since a higher voltage is obtained thereby. The chemical formula thereof may be expressed by, for example, $Li_xM1O_2$ or $Li_yM2PO_4$. In the formulas, M1 and M2 represent one or more transition metal elements. Values of x and y vary according to the charge and discharge state, and may be in the range of $0.05 \leq x \leq 1.10$ and $0.05 \leq y \leq 1.10$.

Examples of the lithium-transition-metal composite oxide may include $LiCoO_2$, $LiNiO_2$, and a lithium-nickel-based composite oxide represented by the following Formula (4). Examples of the lithium-transition-metal-phosphate compound may include $LiFePO_4$ and $LiFe_{1-u}Mn_uPO_4$ (u<1), since thereby, a high battery capacity is obtained and superior cycle characteristics and the like are obtained.

$$LiNi_{1-z}M_zO_2 \quad (4)$$

In Formula (4), M is one or more of Co, Mn, Fe, Al, V, Sn, Mg, Ti, Sr, Ca, Zr, Mo, Tc, Ru, Ta, W, Re, Yb, Cu, Zn, Ba, B, Cr, Si, Ga, P, Sb, and Nb. z satisfies $0.005 < z < 0.5$.

In addition thereto, the cathode material may be, for example, one or more of an oxide, a disulfide, a chalcogenide, a conductive polymer, and the like. Examples of the oxide may include titanium oxide, vanadium oxide, and manganese dioxide. Examples of the disulfide may include titanium disulfide and molybdenum sulfide. Examples of the chalcogenide may include niobium selenide. Examples of the conductive polymer may include sulfur, polyaniline, and polythiophene. However, the cathode material is not limited to the foregoing materials, and may be other material.

Examples of the cathode binder may include one or more of synthetic rubbers, polymer materials, and the like. Examples of the synthetic rubber may include a styrene-butadiene-based rubber, a fluorine-based rubber, and ethylene propylene diene. Examples of the polymer material may include polyvinylidene fluoride and polyimide.

Examples of the cathode electric conductor may include one or more of carbon materials and the like. Examples of the carbon materials may include graphite, carbon black, acetylene black, and Ketjen black. The cathode electric conductor may be a metal material, a conductive polymer, or the like as long as the material has electric conductivity.

[Anode]

As illustrated in FIG. 2, the anode 22 as an electrode has an anode active material layer 22B on a single surface or both surfaces of an anode current collector 22A.

The anode current collector 22A may be made of, for example, one or more of electrically-conductive materials such as copper, nickel, and stainless steel. The surface of the anode current collector 22A may be preferably roughened.

Thereby, due to a so-called anchor effect, adhesion characteristics of the anode active material layer 22B with respect to the anode current collector 22A are improved. In this case, it is enough that the surface of the anode current collector 22A in a region opposed to the anode active material layer 22B is roughened at minimum. Examples of roughening methods may include a method of forming fine particles by utilizing electrolytic treatment. The electrolytic treatment is a method of forming the fine particles on the surface of the anode current collector 22A with the use of an electrolytic method in an electrolytic bath to provide concavity and convexity on the surface thereof. A copper foil fabricated by an electrolytic method is generally called "electrolytic copper foil."

The anode active material layer 22B contains one or more of anode materials capable of inserting and extracting lithium as anode active materials, and such anode materials contain the foregoing active material. However, the anode active material layer 22B may further contain one or more of other materials such as an anode binder and an anode electric conductor. Details of the anode binder and the anode electric conductor may be, for example, similar to those of the cathode binder and the cathode electric conductor.

However, the chargeable capacity of the anode material may be preferably larger than the discharge capacity of the cathode 21 in order to prevent lithium metal from being unintentionally precipitated on the anode 22 in the middle of charge. That is, the electrochemical equivalent of the anode material capable of inserting and extracting lithium may be preferably larger than the electrochemical equivalent of the cathode 21.

It is to be noted that the anode active material layer 22B may further contain other anode material as long as the anode active material layer 22B contains the foregoing active material as an anode material. Examples of other anode material may include one or more of carbon materials. In the carbon material, its crystal structure change at the time of insertion and extraction of lithium is extremely small, and therefore, the carbon material provides high energy density and superior cycle characteristics. Further, the carbon material functions as an anode electric conductor as well. Examples of the carbon material may include graphitizable carbon, non-graphitizable carbon, and graphite. However, the spacing of (002) plane in the non-graphitizable carbon may be preferably equal to or greater than 0.37 nm, and the spacing of (002) plane in graphite may be preferably equal to or smaller than 0.34 nm. More specifically, examples of the carbon material may include pyrolytic carbons, cokes, glassy carbon fiber, an organic polymer compound fired body, activated carbon, and carbon blacks. Examples of the cokes may include pitch coke, needle coke, and petroleum coke. The organic polymer compound fired body is obtained by firing (carbonizing) a polymer compound such as a phenol resin and a furan resin at appropriate temperature. In addition thereto, the carbon material may be low crystalline carbon or amorphous carbon heat-treated at temperature of about 1000 deg C. or less. It is to be noted that the shape of the carbon material may be any of a fibrous shape, a spherical shape, a granular shape, and a scale-like shape.

Further, other anode material may be, for example, a material (metal-based material) containing one or more of metal elements and metalloid elements as constitutional elements, since higher energy density is thereby obtained. Such a metal-based material may be a simple substance, an alloy, or a compound, may be two or more thereof, or may have one or more phases thereof in part or all thereof. "Alloy" includes a material containing one or more metal elements and one or more metalloid elements, in addition to a material configured of two or more metal elements. Further, the "alloy" may contain a nonmetallic element. Examples of the structure thereof may include a solid solution, a eutectic crystal (eutectic mixture), an intermetallic compound, and a structure in which two or more thereof coexist.

Examples of the foregoing metal elements and the foregoing metalloid elements may include one or more of metal elements and metalloid elements capable of forming an alloy with lithium. Specific examples thereof may include Mg, B, Al, Ga, In, Si, Ge, Sn, Pb, Bi, Cd, Ag, Zn, Hf, Zr, Y, Pd, and Pt. In particular, Si, Sn, or both may be preferable. One reason for this is that Si and Sn have a superior ability of inserting and extracting lithium, and therefore, provide high energy density.

A material containing Si, Sn, or both as constituent elements may be any of a simple substance, an alloy, and a compound of Si, may be any of a simple substance, an alloy, and a compound of Sn, may be two or more thereof, or may have one or more phases thereof in part or all thereof. It is to be noted that the simple substance merely refers to a general simple substance (a small amount of impurity may be therein contained), and does not necessarily refer to a purity 100% simple substance.

The alloys of Si may contain, for example, one or more of elements such as Sn, Ni, Cu, Fe, Co, Mn, Zn, In, Ag, Ti, Ge, Bi, Sb, and Cr as constituent elements other than Si. The compounds of Si may contain, for example, one or more of C, O, and the like as constituent elements other than Si. It is to be noted that, for example, the compounds of Si may contain one or more of the elements described for the alloys of Si as constituent elements other than Si.

Examples of the alloys of Si and the compounds of Si may include $SiB_4$, $SiB_6$, $Mg_2Si$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$, $ZnSi_2$, $SiC$, $Si_3N_4$, $Si_2N_2O$, $SiO_v$ ($0<v\le2$), and $LiSiO$. v in $SiO_v$ may be in the range of $0.2<v<1.4$.

The alloys of Sn may contain, for example, one or more of elements such as Si, Ni, Cu, Fe, Co, Mn, Zn, In, Ag, Ti, Ge, Bi, Sb, and Cr as constituent elements other than Sn. The compounds of Sn may contain, for example, one or more of elements such as C and O as constituent elements other than Sn. It is to be noted that the compounds of Sn may contain, for example, one or more of elements described for the alloys of Sn as constituent elements other than Sn. Examples of the alloys of Sn and the compounds of Sn may include $SnO_w$ ($0<w\le2$), $SnSiO_3$, $LiSnO$, and $Mg_2Sn$.

Further, as a material containing Sn as a constituent element, for example, a material containing a second constituent element and a third constituent element in addition to Sn as a first constituent element may be preferable. Examples of the second constituent element may include one or more of elements such as Co, Fe, Mg, Ti, V, Cr, Mn, Ni, Cu, Zn, Ga, Zr, Nb, Mo, Ag, In, Ce, Hf, Ta, W, Bi, and Si. Examples of the third constituent element may include one or more of B, C, Al, P, and the like. In the case where the second constituent element and the third constituent element are contained, a high battery capacity, superior cycle characteristics, and the like are obtained.

In particular, a material (SnCoC-containing material) containing Sn, Co, and C as constituent elements may be preferable. The composition of the SnCoC-containing material may be, for example, as follows. That is, the C content may be from 9.9 mass % to 29.7 mass % both inclusive, and the ratio of Sn and Co contents (Co/(Sn+Co)) may be from 20 mass % to 70 mass % both inclusive, since high energy density is obtained in such a composition range.

It may be preferable that the SnCoC-containing material have a phase containing Sn, Co, and C. Such a phase may be preferably low-crystalline or amorphous. The phase is a phase (reaction phase) capable of reacting with lithium. Due to existence of the reaction phase, superior characteristics are obtained. The half bandwidth of the diffraction peak obtained by an XRD method of the phase may be preferably equal to or greater than 1 deg based on diffraction angle of 2θ in the case where CuKα ray is used as a specific X ray, and the insertion rate is 1 deg/min. Thereby, lithium is more smoothly inserted and extracted, and reactivity with the electrolytic solution is decreased. It is to be noted that, in some cases, the SnCoC-containing material includes a phase containing a simple substance or part of the respective constituent elements in addition to the low-crystalline phase or the amorphous phase.

Whether or not the diffraction peak obtained by the X-ray diffraction corresponds to the reaction phase capable of reacting with lithium is allowed to be easily determined by comparison between X-ray diffraction charts before and after electrochemical reaction with lithium. For example, if the position of the diffraction peak after electrochemical reaction with lithium is changed from the position of the diffraction peak before the electrochemical reaction with lithium, the obtained diffraction peak corresponds to the reaction phase capable of reacting with lithium. In this case, for example, the diffraction peak of the low crystalline reaction phase or the amorphous reaction phase is seen in the range of 2θ=from 20 deg to 50 deg both inclusive. Such a reaction phase may have, for example, the foregoing respective constituent elements, and the low crystalline or amorphous structure thereof possibly results from existence of C mainly.

In the SnCoC-containing material, part or all of C as a constituent element may be preferably bonded to a metal element or a metalloid element as other constituent element, since cohesion or crystallization of Sn and/or the like is suppressed thereby. The bonding state of elements is allowed to be checked by, for example, an X-ray photoelectron spectroscopy method (XPS). In a commercially-available device, for example, as a soft X ray, Al-Kα ray, Mg-Kα ray, or the like may be used. In the case where part or all of C are bonded to a metal element, a metalloid element, or the like, the peak of a synthetic wave of is orbit of C(C1s) is shown in a region lower than 284.5 eV. It is to be noted that, in the device, energy calibration is made so that the peak of 4f orbit of Au atom (Au4f) is obtained in 84.0 eV. At this time, in general, since surface contamination carbon exists on the material surface, the peak of C1s of the surface contamination carbon is regarded as 284.8 eV, which is used as the energy standard. In XPS measurement, the waveform of the peak of C1s is obtained as a form including the peak of the surface contamination carbon and the peak of carbon in the SnCoC-containing material. Therefore, for example, analysis may be made with the use of commercially-available software to isolate both peaks from each other. In the waveform analysis, the position of the main peak existing on the lowest bound energy side is the energy standard (284.8 eV).

It is to be noted that the SnCoC-containing material is not limited to the material (SnCoC) configured of only Sn, Co, and C as constituent elements. That is, the SnCoC-containing material may further contain, for example, one or more of Si, Fe, Ni, Cr, In, Nb, Ge, Ti, Mo, Al, P, Ga, Bi, and the like as constituent elements, in addition to Sn, Co, and C.

In addition to the SnCoC-containing material, a material containing Sn, Co, Fe, and C as constituent elements (SnCoFeC-containing material) may be also preferable. The composition of the SnCoFeC-containing material may be any composition. For example, the composition in which the Fe content is set small may be as follows. That is, the C content may be from 9.9 mass % to 29.7 mass % both inclusive, the Fe content may be from 0.3 mass % to 5.9 mass % both inclusive, and the ratio of contents of Sn and Co (Co/(Sn+Co)) may be from 30 mass % to 70 mass % both inclusive. Further, the composition in which the Fe content is set large is as follows. That is, the C content is from 11.9 mass % to 29.7 mass % both inclusive, the ratio of contents of Sn, Co, and Fe ((Co+Fe)/(Sn+Co+Fe)) is from 26.4 mass % to 48.5 mass % both inclusive, and the ratio of contents of Co and Fe (Co/(Co+Fe)) is from 9.9 mass % to 79.5 mass % both inclusive. In such a composition range, high energy density is obtained. The physical properties (such as half bandwidth) of the SnCoFeC-containing material are similar to those of the foregoing SnCoC-containing material.

In addition thereto, the anode material may be, for example, one or more of a metal oxide, a polymer compound, and the like. Examples of the metal oxide may include iron oxide, ruthenium oxide, and molybdenum oxide. Examples of the polymer compound may include polyacetylene, polyaniline, and polypyrrole. However, the anode material is not limited to the foregoing material, and may be other material.

The anode active material layer 22B may be formed by, for example, one or more of a coating method, a vapor-phase deposition method, a liquid-phase deposition method, a spraying method, and a firing method (sintering method). The coating method may be a method in which, for example, after a particulate (powder) anode active material is mixed with an anode binder and/or the like, the mixture is dispersed in a solvent such as an organic solvent, and the anode current collector 22A is coated with the resultant. Examples of the vapor-phase deposition method may include a physical deposition method and a chemical deposition method. More specifically, examples thereof may include a vacuum evaporation method, a sputtering method, an ion plating method, a laser ablation method, a thermal chemical vapor deposition method, a chemical vapor deposition (CVD) method, and a plasma chemical vapor deposition method. Examples of the liquid-phase deposition method may include an electrolytic plating method and an electroless plating method. The spraying method is a method in which an anode active material in a fused state or a semi-fused state is sprayed to the anode current collector 22A. The firing method may be, for example, a method in which after the anode current collector 22A is coated by a coating method, heat treatment is performed at temperature higher than the melting point of the anode binder and/or the like. Examples of the firing method may include an atmosphere firing method, a reactive firing method, and a hot press firing method.

In the secondary battery, as described above, in order to prevent lithium metal from being unintentionally precipitated on the anode 22 in the middle of charge, the electrochemical equivalent of the anode material capable of inserting and extracting lithium may be preferably larger than the electrochemical equivalent of the cathode. Further, in the case where the open circuit voltage (that is, a battery voltage) at the time of completely-charged state is equal to or greater than 4.25 V, the extraction amount of lithium ions per unit mass is larger than that in the case where the open circuit voltage is 4.2 V even if the same cathode active material is used. Therefore, amounts of the cathode active material and the anode active material are adjusted accordingly. Thereby, high energy density is obtainable.

[Separator]

The separator 23 separates the cathode 21 from the anode 22, and passes lithium ions while preventing current short circuit resulting from contact of both electrodes. The separator 23 may be, for example, a porous film made of a synthetic resin, ceramics, or the like. The separator 23 may be a laminated film in which two or more types of porous films are laminated. Examples of the synthetic resin may include polytetrafluoroethylene, polypropylene, and polyethylene.

In particular, the separator 23 may include, for example, a polymer compound layer provided on one surface or both surfaces of the foregoing porous film (base material layer). One reason for this is that, thereby, adhesion characteristics of the separator 23 with respect to the cathode 21 and the anode 22 are improved, and therefore, skewness of the spirally wound electrode body 20 is suppressed. Thereby, a decomposition reaction of the electrolytic solution is suppressed, and liquid leakage of the electrolytic solution with which the base material layer is impregnated is suppressed. Accordingly, even if charge and discharge are repeated, the resistance is less likely to be increased, and battery swollenness is suppressed.

The polymer compound layer may contain, for example, a polymer material such as polyvinylidene fluoride, since such a polymer material has superior physical strength and is electrochemically stable. However, the polymer material may be a polymer material other than polyvinylidene fluoride. The polymer compound layer may be formed as follows, for example. That is, after a solution in which the polymer material is dissolved is prepared, the base material layer is coated with the solution, and the resultant is subsequently dried. Alternatively, the base material layer may be soaked in the solution and may be subsequently dried.

[Electrolytic Solution]

The separator 23 is impregnated with an electrolytic solution as a liquid electrolyte. The electrolytic solution contains a solvent and an electrolyte salt, and may further contain one or more of other materials such as an additive.

The solvent contains one or more of nonaqueous solvents such as an organic solvent. Examples of the nonaqueous solvents may include a cyclic ester carbonate, a chain ester carbonate, lactone, a chain carboxylic ester, and nitrile, since a superior battery capacity, superior cycle characteristics, superior conservation characteristics, and the like are thereby obtained. Examples of the cyclic ester carbonate may include ethylene carbonate, propylene carbonate, and butylene carbonate. Examples of the chain ester carbonate may include dimethyl carbonate, diethyl carbonate, ethyl methyl carbonate, and methylpropyl carbonate. Examples of the lactone may include γ-butyrolactone and γ-valerolactone. Examples of the carboxylic ester may include methyl acetate, ethyl acetate, methyl propionate, ethyl propionate, methyl butyrate, methyl isobutyrate, methyl trimethylacetate, and ethyl trimethylacetate. Examples of the nitrile may include acetonitrile, glutaronitrile, adiponitrile, methoxyacetonitrile, and 3-methoxypropionitrile.

In addition thereto, the nonaqueous solvent may be, for example, 1,2-dimethoxyethane, tetrahydrofuran, 2-methyltetrahydrofuran, tetrahydropyran, 1,3-dioxolane, 4-methyl-1,3-dioxolane, 1,3-dioxane, 1,4-dioxane, N,N-dimethylformamide, N-methylpyrrolidinone, N-methyloxazolidinone, N,N'-dimethylimidazolidinone, nitromethane, nitroethane, sulfolane, trimethyl phosphate, or dimethyl sulfoxide, since thereby, a similar advantage is obtained.

In particular, one or more of ethylene carbonate, propylene carbonate, dimethyl carbonate, diethyl carbonate, and ethyl methyl carbonate may be preferable, since a further superior battery capacity, further superior cycle characteristics, further superior conservation characteristics, and the like are thereby obtained. In this case, a combination of a high viscosity (high dielectric constant) solvent (for example, specific dielectric constant $\in \geq 30$) such as ethylene carbonate and propylene carbonate and a low viscosity solvent (for example, viscosity≤1 mPa·s) such as dimethyl carbonate, ethylmethyl carbonate, and diethyl carbonate may be more preferable. One reason for this is that the dissociation property of the electrolyte salt and ion mobility are thereby improved.

In particular, the solvent may preferably contain one or more of an unsaturated cyclic ester carbonate, a halogenated ester carbonate, sultone (cyclic sulfonic ester), an acid anhydride, and the like. One reason for this is that, in this case, chemical stability of the electrolytic solution is improved. The unsaturated cyclic ester carbonate is a cyclic ester carbonate including one or more unsaturated carbon bonds (carbon-carbon double bonds). Examples of the unsaturated cyclic ester carbonate may include vinylene carbonate, vinylethylene carbonate, and methyleneethylene carbonate. The halogenated ester carbonate is a cyclic ester carbonate having one or more halogens as constituent elements or a chain ester carbonate having one or more halogens as constituent elements. Examples of the cyclic halogenated ester carbonate may include 4-fluoro-1,3-dioxolane-2-one and 4,5-difluoro-1,3-dioxolane-2-one. Examples of the chain halogenated ester carbonate may include fluoromethyl methyl carbonate, bis(fluoromethyl) carbonate, and difluoromethyl methyl carbonate. Examples of the sultone may include propane sultone and propene sultone. Examples of the acid anhydrides may include a succinic anhydride, an ethane disulfonic anhydride, and a sulfobenzoic anhydride. However, the solvent is not limited to the foregoing material, and may be other material.

The electrolyte salt may contain, for example, one or more of salts such as a lithium salt. However, the electrolyte salt may contain a salt other than the lithium salt. Examples of the salt other than the lithium salt may include a light metal salt other than the lithium salt.

Examples of the lithium salts may include lithium hexafluorophosphate ($LiPF_6$), lithium tetrafluoroborate ($LiBF_4$), lithium perchlorate ($LiClO_4$), lithium hexafluoroarsenate ($LiAsF_6$), lithium tetraphenylborate ($LiB(C_6H_5)_4$), lithium methanesulfonate ($LiCH_3SO_3$), lithium trifluoromethane sulfonate ($LiCF_3SO_3$), lithium tetrachloroaluminate ($LiAlCl_4$), dilithium hexafluorosilicate ($Li_2SiF_6$), lithium chloride (LiCl), and lithium bromide (LiBr). Thereby, a superior battery capacity, superior cycle characteristics, superior conservation characteristics, and the like are obtained.

In particular, one or more of $LiPF_6$, $LiBF_4$, $LiClO_4$, and $LiAsF_6$ may be preferable, and $LiPF_6$ may be more preferable, since the internal resistance is thereby lowered, and therefore, a higher effect is obtained. However, the electrolyte salt is not limited to the foregoing materials, and may be other material.

Although the content of the electrolyte salt is not particularly limited, the content thereof may be preferably from 0.3 mol/kg to 3.0 mol/kg both inclusive with respect to the solvent, since high ion conductivity is obtained thereby.

[Operation of Secondary Battery]

The secondary battery operates, for example, as follows. At the time of charge, lithium ions extracted from the cathode 21 may be inserted in the anode 22 through the electrolytic solution. In contrast, at the time of discharge, lithium ions extracted from the anode 22 may be inserted in the cathode 21 through the electrolytic solution.

[Method of Manufacturing Secondary Battery]

The secondary battery may be manufactured, for example, by the following procedure.

First, the cathode 21 is fabricated. The cathode active material is mixed with the cathode binder, the cathode electric conductor, and/or the like to prepare a cathode mixture. Subsequently, the cathode mixture is dispersed in an organic solvent or the like to obtain paste cathode mixture slurry. Subsequently, both surfaces of the cathode current collector 21A are coated with the cathode mixture slurry, which is dried to form the cathode active material layer 21B. Subsequently, the cathode active material layer 21B is compression-molded with the use of a roll pressing machine and/or the like. In this case, compression-molding may be performed while heating, or compression-molding may be repeated several times.

Further, the anode 22 is fabricated by a procedure similar to that of the cathode 21 described above. The foregoing active material as an anode active material is mixed with the anode binder, the anode electric conductor, and/or the like to prepare an anode mixture, which is subsequently dispersed in an organic solvent or the like to form paste anode mixture slurry. Subsequently, both surfaces of the anode current collector 22A are coated with the anode mixture slurry, which is dried to form the anode active material layer 22B. Thereafter, the anode active material layer 22B is compression-molded.

Finally, the secondary battery is assembled using the cathode 21 and the anode 22. The cathode lead 25 is attached to the cathode current collector 21A by a welding method and/or the like, and the anode lead 26 is attached to the anode current collector 22A by a welding method and/or the like. Subsequently, the cathode 21 and the anode 22 are layered with the separator 23 in between and are spirally wound, and the spirally wound electrode body 20 is thereby fabricated. Thereafter, the center pin 24 is inserted in the center of the spirally wound electrode body. Subsequently, the spirally wound electrode body 20 is sandwiched between the pair of insulating plates 12 and 13, and is contained in the battery can 11. In this case, the end tip of the cathode lead 25 is attached to the safety valve mechanism 15 by a welding method and/or the like, and the end tip of the anode lead 26 is attached to the battery can 11 by a welding method and/or the like. Subsequently, the electrolytic solution in which the electrolyte salt is dispersed in the solvent is injected into the battery can 11, and the separator 23 is impregnated with the electrolytic solution. Subsequently, at the open end of the battery can 11, the battery cover 14, the safety valve mechanism 15, and the PTC device 16 are fixed by being swaged with the gasket 17.

[Function and Effect of Secondary Battery]

According to the cylindrical-type secondary battery, the anode active material layer 22B of the anode 22 contains the foregoing active material as an anode active material. In this case, as described above, since high energy density is obtained, a high battery capacity is obtained, and unintentional precipitation of lithium metal at the time of charge and discharge is suppressed, and therefore, safety is secured. Therefore, both capacity characteristics and safety are achievable. Other functions and other effects are similar to those of the active material.

[2-2. Electrode and Secondary Battery (Laminated-Film-Type Lithium Ion Secondary Battery)]

Figure 3:
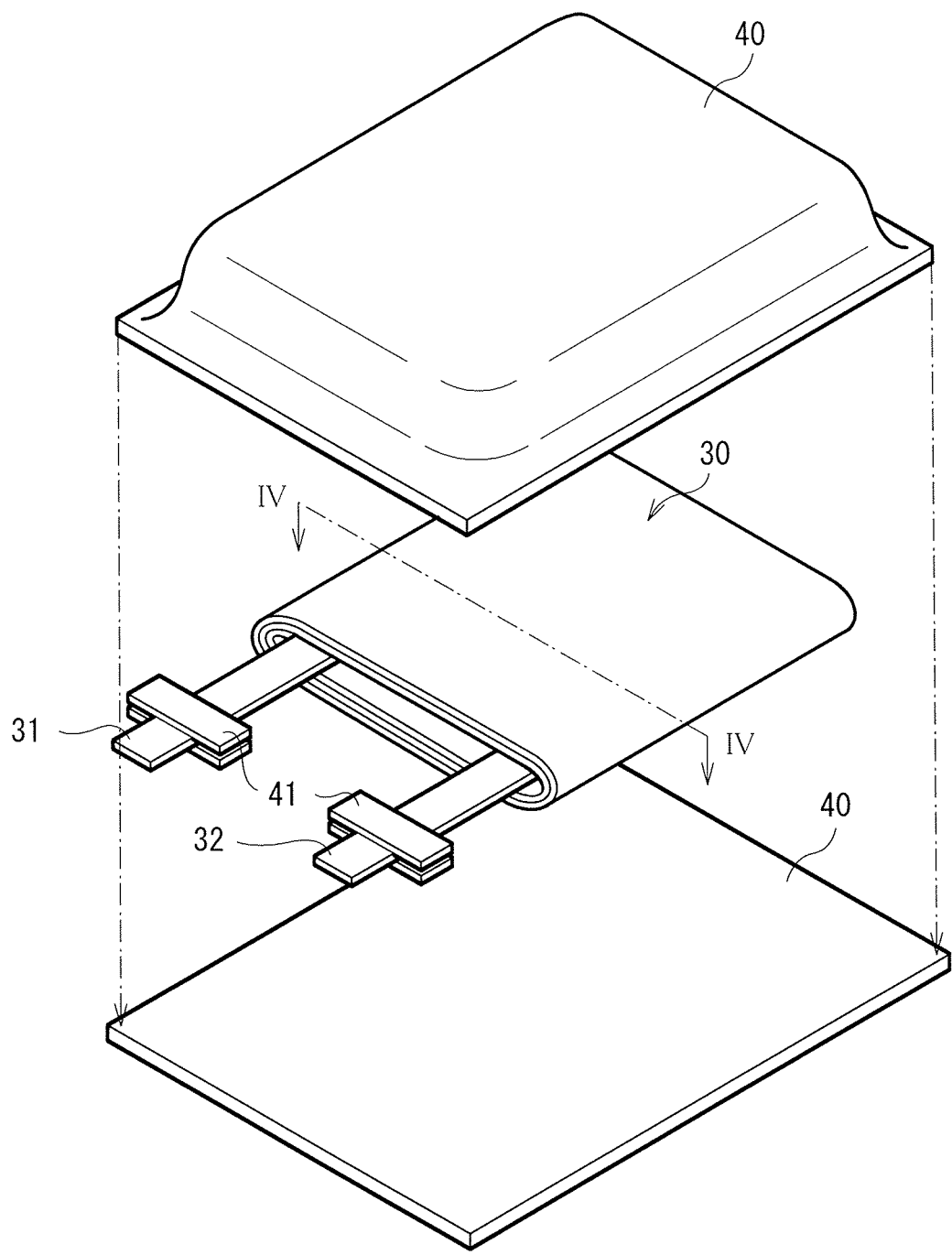
FIG. 3 is a perspective view illustrating configurations of another electrode and another secondary battery (laminated film type) that use the active material according to the embodiment of the present application.
Figure 4:
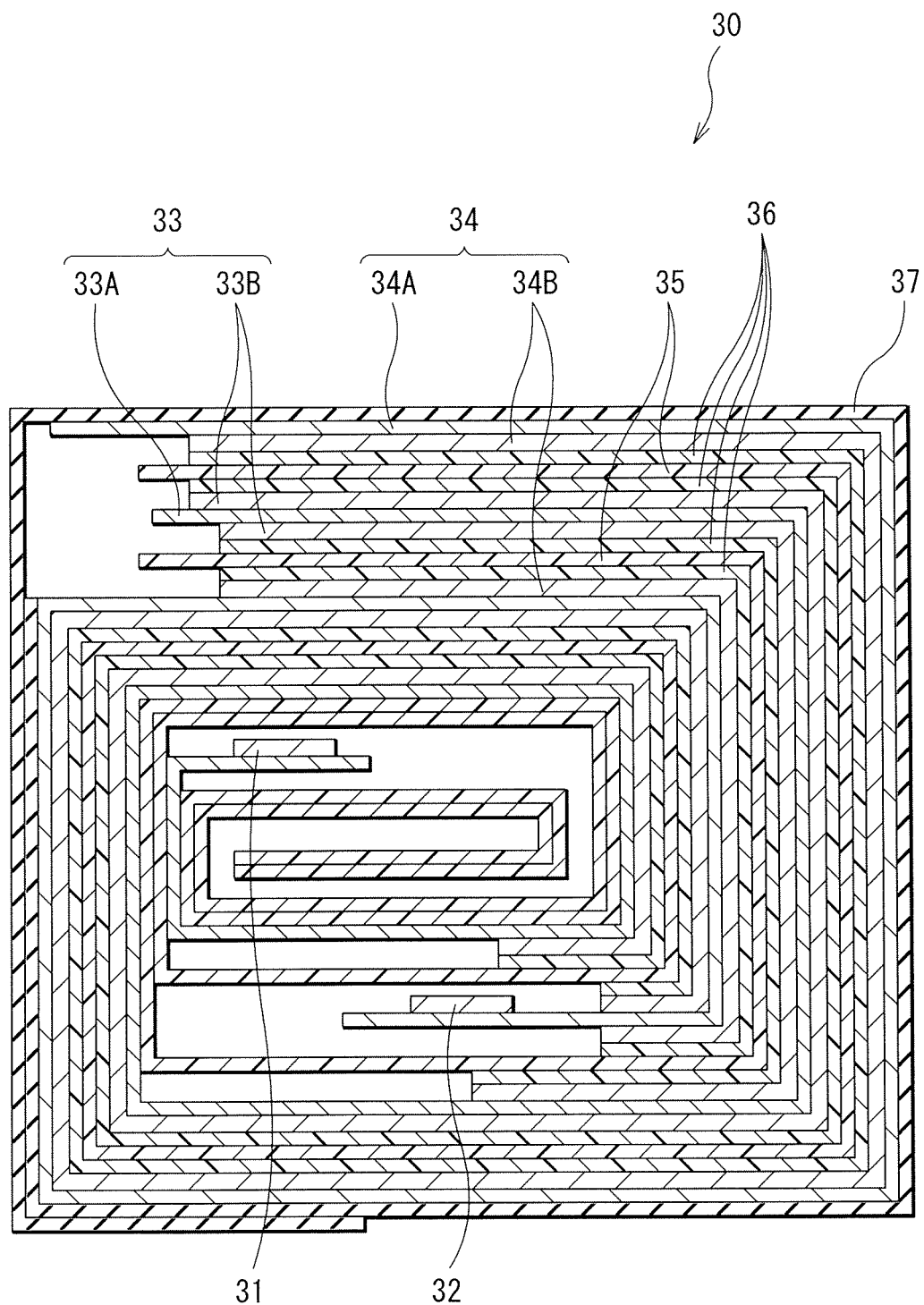
FIG. 4 is a cross-sectional view taken along a line IV-IV of a spirally wound electrode body illustrated in FIG. 3.

FIG. 3 illustrates an exploded perspective configuration of another secondary battery. FIG. 4 illustrates an enlarged cross-section taken along a line IV-IV of a spirally wound electrode body 30 illustrated in FIG. 3. However, FIG. 3 illustrates a state that the spirally wound electrode body 30 is separated from two outer package members 40. In this embodiment, for example, the electrode is applied to an anode 34. In the following description, the elements of the cylindrical-type secondary battery described above will be used as necessary.

[Whole Configuration of Secondary Battery]

The secondary battery described here is a so-called laminated-film-type lithium ion secondary battery. For example, as illustrated in FIG. 3, the spirally wound electrode body 30 may be contained in a film-like outer package member 40. In the spirally wound electrode body 30, a cathode 33 and the anode 34 are layered with a separator 35 and an electrolyte layer 36 in between and are spirally wound. A cathode lead 31 is attached to the cathode 33, and an anode lead 32 is attached to the anode 34. The outermost periphery of the spirally wound electrode body 30 is protected by a protective tape 37.

The cathode lead 31 and the anode lead 32 may be, for example, led out from inside to outside of the outer package member 40 in the same direction. The cathode lead 31 may be made of, for example, an electrically-conductive material such as aluminum, and the anode lead 32 may be made of, for example, an electrically-conducive material such as copper, nickel, and stainless steel. These electrically-conductive materials may be in the shape of, for example, a thin plate or mesh.

The outer package member 40 may be a laminated film in which, for example, a fusion bonding layer, a metal layer, and a surface protective layer are laminated in this order. The outer package member 40 may be obtained by, for example, layering two laminated films so that the fusion bonding layers are opposed to the spirally wound electrode body 30, and subsequently fusion bonding outer edges of the respective fusion bonding layers. However, the two laminated films may be bonded to each other by an adhesive, or the like. Examples of the fusion bonding layer may include a film made of polyethylene, polypropylene, or the like. Examples of the metal layer may include an aluminum foil. Examples of the surface protective layer may include a film made of nylon, polyethylene terephthalate, or the like.

In particular, the outer package member 40 may preferably be an aluminum laminated film in which a polyethylene film, an aluminum foil, and a nylon film are laminated in this order. However, the outer package member 40 may be a laminated film having other laminated structure, a polymer film such as polypropylene, or a metal film.

For example, an adhesive film 41 to prevent outside air intrusion may be inserted between the outer package member 40 and the cathode lead 31 and between the outer package member 40 and the anode lead 32. The adhesive film 41 is made of a material having adhesion characteristics with respect to the cathode lead 31 and the anode lead 32. Examples of the material having adhesion characteristics may include a polyolefin resin. More specific examples thereof may include polyethylene, polypropylene, modified polyethylene, and modified polypropylene.

As illustrated in FIG. 4, the cathode 33 may have, for example, a cathode active material layer 33B on both surfaces of a cathode current collector 33A. The anode 34 may have, for example, an anode active material layer 34B on both surfaces of an anode current collector 34A. The configurations of the cathode current collector 33A, the cathode active material layer 33B, the anode current collector 34A, and the anode active material layer 34B are similar to the configurations of the cathode current collector 21A, the cathode active material layer 21B, the anode current collector 22A, and the anode active material layer 22B, respectively. That is, the anode active material layer 34B of the anode 34 as an electrode contains the foregoing active material as an anode active material. The configuration of the separator 35 is similar to the configuration of the separator 23.

[Electrolyte Layer]

In the electrolyte layer 36, an electrolytic solution is held by a polymer compound. The electrolyte layer 36 is a so-called gel electrolyte, since thereby, high ion conductivity (for example, 1 mS/cm or more at room temperature) is obtained and liquid leakage of the electrolytic solution is prevented. The electrolyte layer 36 may further contain other material such as an additive.

The polymer compound contains one or more of polymer materials. Examples of the polymer materials may include polyacrylonitrile, polyvinylidene fluoride, polytetrafluoroethylene, polyhexafluoropropylene, polyethylene oxide, polypropylene oxide, polyphosphazene, polysiloxane, polyvinyl fluoride, polyvinyl acetate, polyvinyl alcohol, polymethacrylic acid methyl, polyacrylic acid, polymethacrylic acid, styrene-butadiene rubber, nitrile-butadiene rubber, polystyrene, and polycarbonate. In addition thereto, the polymer material may be a copolymer. The copolymer may be, for example, a copolymer of vinylidene fluoride and hexafluoro propylene. In particular, polyvinylidene fluoride or the copolymer of vinylidene fluoride and hexafluoro propylene may be preferable, and polyvinylidene fluoride may be more preferable, since such a polymer compound is electrochemically stable.

For example, the composition of the electrolytic solution may be similar to the composition of the electrolytic solution of the cylindrical-type secondary battery. However, in the electrolyte layer 36 as a gel electrolyte, the solvent of the electrolytic solution refers to a wide concept including not only a liquid solvent but also a material having ion conductivity capable of dissociating the electrolyte salt. Therefore, in the case where a polymer compound having ion conductivity is used, the polymer compound is also included in the solvent.

It is to be noted that the electrolytic solution may be used as it is instead of the gel electrolyte layer 36. In this case, the separator 35 is impregnated with the electrolytic solution.

[Operation of Secondary Battery]

The secondary battery may operate, for example, as follows. At the time of charge, lithium ions extracted from the cathode 33 may be inserted in the anode 34 through the electrolyte layer 36. In contrast, at the time of discharge, lithium ions extracted from the anode 34 may be inserted in the cathode 33 through the electrolyte layer 36.

[Method of Manufacturing Secondary Battery]

The secondary battery including the gel electrolyte layer 36 may be manufactured, for example, by the following three types of procedures.

In the first procedure, the cathode 33 and the anode 34 are fabricated by a fabrication procedure similar to that of the cathode 21 and the anode 22. In this case, the cathode 33 is fabricated by forming the cathode active material layer 33B on both surfaces of the cathode current collector 33A, and the anode 34 is fabricated by forming the anode active material layer 34B on both surfaces of the anode current collector 34A. Subsequently, a precursor solution containing an electrolytic solution, a polymer compound, and a solvent such as an organic solvent is prepared. Thereafter, the cathode 33 and the anode 34 are coated with the precursor solution to form the gel electrolyte layer 36. Subsequently, the cathode lead 31 is attached to the cathode current collector 33A by a welding method and/or the like, and the anode lead 32 is attached to the anode current collector 34A by a welding method and/or the like. Subsequently, the cathode 33 and the anode 34 are layered with the separator 35 in between and are spirally wound to fabricate the spirally wound electrode body 30. Thereafter, the protective tape 37 is adhered to the outermost periphery thereof. Subsequently, after the spirally wound electrode body 30 is sandwiched between two pieces of film-like outer package members 40, the outer edges of the outer package members 40 are bonded by a thermal fusion bonding method and/or the like to enclose the spirally wound electrode body 30 into the outer package members 40. In this case, the adhesive films 41 are inserted between the cathode lead 31 and the outer package member 40 and between the anode lead 32 and the outer package member 40.

In the second procedure, the cathode lead 31 is attached to the cathode 33, and the anode lead 32 is attached to the anode 34. Subsequently, the cathode 33 and the anode 34 are layered with the separator 35 in between and are spirally wound to fabricate a spirally wound body as a precursor of the spirally wound electrode body 30. Thereafter, the protective tape 37 is adhered to the outermost periphery thereof. Subsequently, after the spirally wound body is sandwiched between two pieces of the film-like outer package members 40, the outermost peripheries except for one side are bonded by a thermal fusion bonding method and/or the like, and the spirally wound body is contained in the pouch-like outer package member 40. Subsequently, an electrolytic solution, a monomer as a raw material for the polymer compound, a polymerization initiator, and other materials such as a polymerization inhibitor are mixed to prepare a composition for electrolyte. Subsequently, the composition for electrolyte is injected into the pouch-like outer package member 40. Thereafter, the outer package member 40 is hermetically sealed by a thermal fusion bonding method and/or the like. Subsequently, the monomer is thermally polymerized, and thereby, a polymer compound is formed. Thereby, the polymer compound is impregnated with the electrolytic solution, the polymer compound is gelated, and accordingly, the electrolyte layer 36 is formed.

In the third procedure, the spirally wound body is fabricated and contained in the pouch-like outer package member 40 in a manner similar to that of the foregoing second procedure, except that the separator 35 with both surfaces coated with a polymer compound is used. Examples of the polymer compound with which the separator 35 is coated may include a polymer (a homopolymer, a copolymer, or a multicomponent copolymer) containing vinylidene fluoride as a component. Specific examples of the homopolymer may include polyvinylidene fluoride. Examples of the copolymer may include a binary copolymer containing vinylidene fluoride and hexafluoro propylene as components. Examples of the multicomponent copolymer may include a ternary copolymer containing vinylidene fluoride, hexafluoro propylene, and chlorotrifluoroethylene as components. It is to be noted that, in addition to the polymer containing vinylidene fluoride as a component, other one or more polymer compounds may be used. Subsequently, an electrolytic solution is prepared and injected into the outer package member 40. Thereafter, the opening of the outer package member 40 is hermetically sealed by a thermal fusion bonding method and/or the like. Subsequently, the resultant is heated while a weight is applied to the outer package member 40, and the separator 35 is adhered to the cathode 33 and the anode 34 with the polymer compound in between. Thereby, the polymer compound is impregnated with the electrolytic solution, the polymer compound is gelated, and accordingly, the electrolyte layer 36 is formed.

In the third procedure, swollenness of the secondary battery is suppressed more than in the first procedure. Further, in the third procedure, the monomer as a raw material of the polymer compound, the solvent, and the like are less likely to be left in the electrolyte layer 36 compared to in the second procedure. Therefore, the formation step of the polymer compound is favorably controlled. Therefore, sufficient adhesion characteristics are obtained between the cathode 33, the anode 34, and the separator 35, and the electrolyte layer 36.

[Function and Effect of Secondary Battery]

According to the laminated-film-type secondary battery, since the anode active material layer 34B of the anode 34 contains the foregoing active material as an anode active material. Therefore, both capacity characteristics and safety are achievable for a reason similar to that of the cylindrical-type secondary battery. Other functions and other effects are similar to those of the cylindrical-type secondary battery.

[3. Applications of Secondary Battery]

Next, a description will be given of application examples of the foregoing secondary battery.

Applications of the secondary battery are not particularly limited as long as the secondary battery is applied to a machine, a device, an instrument, an apparatus, a system (collective entity of a plurality of devices and the like), or the like that is allowed to use the secondary battery as a driving electric power source, an electric power storage source for electric power storage, or the like. The secondary battery used as an electric power source may be a main electric power source (electric power source used preferentially), or may be an auxiliary electric power source (electric power source used instead of a main electric power source or used being switched from the main electric power source). In the case where the secondary batter is utilized as an auxiliary electric power source, the main electric power source type is not limited to the secondary battery.

Examples of applications of the secondary battery may include electronic apparatuses (including portable electronic apparatuses) such as a video camcorder, a digital still camera, a mobile phone, a notebook personal computer, a cordless phone, a headphone stereo, a portable radio, a portable television, and a personal digital assistant. Further examples thereof may include a mobile lifestyle electric appliance such as an electric shaver; a memory device such as a backup electric power source and a memory card; an electric power tool such as an electric drill and an electric saw; a battery pack used as a removable and replaceable electric power source of a notebook personal computer or the like; a medical electronic apparatus such as a pacemaker and a hearing aid; an electric vehicle such as an electric automobile (including a hybrid automobile); and an electric power storage system such as a home battery system for storing electric power for emergency or the like. It goes without saying that an application other than the foregoing applications may be adopted.

In particular, the secondary battery is effectively applicable to the battery pack, the electric vehicle, the electric power storage system, the electric power tool, the electronic apparatus, or the like. One reason for this is that, in these applications, since superior battery characteristics are demanded, performance is effectively improved with the use of the secondary battery according to the embodiment of the present application. It is to be noted that the battery pack is an electric power source using a secondary battery, and is a so-called assembled battery or the like. The electric vehicle is a vehicle that works (runs) with the use of a secondary battery as a driving electric power source. As described above, the electric vehicle may be an automobile (such as a hybrid automobile) including a drive source other than a secondary battery. The electric power storage system is a system using a secondary battery as an electric power storage source. For example, in a home electric power storage system, electric power is stored in the secondary battery as an electric power storage source, and therefore, home electric products and the like become usable with the use of the electric power. The electric power tool is a tool in which a movable section (such as a drill) is moved with the use of a secondary battery as a driving electric power source. The electronic apparatus is an apparatus executing various functions with the use of a secondary battery as a driving electric power source (electric power supply source).

A description will be specifically given of some application examples of the secondary battery. It is to be noted that the configurations of the respective application examples explained below are merely examples, and may be changed as appropriate.

[3-1. Battery Pack]

Figure 5:
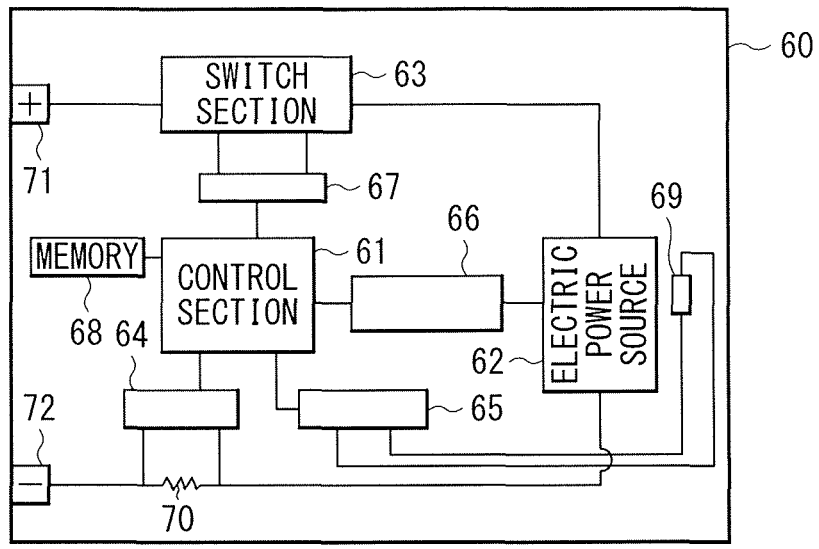
FIG. 5 is a block diagram illustrating a configuration of an application example (battery pack) of the secondary battery.

FIG. 5 illustrates a block configuration of a battery pack. For example, the battery pack may include a control section 61, an electric power source 62, a switch section 63, a current measurement section 64, a temperature detection section 65, a voltage detection section 66, a switch control section 67, a memory 68, a temperature detection device 69, a current detection resistance 70, a cathode terminal 71, and an anode terminal 72 in a housing 60. It is to be noted that the housing 60 may be made of, for example, a plastic material and/or the like.

The control section 61 controls operation of the whole battery pack (including a used state of the electric power source 62), and may include, for example, a central processing unit (CPU) and/or the like. The electric power source 62 includes one or more secondary batteries (not illustrated). The electric power source 62 may be, for example, an assembled battery including two or more secondary batteries. Connection type of the secondary batteries may be a series-connected type, may be a parallel-connected type, or may be a mixed type thereof. As an example, the electric power source 62 may include six secondary batteries connected in a manner of dual-parallel and three-series.

The switch section 63 switches the used state of the electric power source 62 (whether or not the electric power source 62 is connectable to an external device) according to an instruction of the control section 61. The switch section 63 may include, for example, a charge control switch, a discharge control switch, a charging diode, a discharging diode, and the like (not illustrated). The charge control switch and the discharge control switch may each be, for example, a semiconductor switch such as a field-effect transistor (MOSFET) using a metal oxide semiconductor.

The current measurement section 64 measures a current with the use of the current detection resistance 70, and outputs the measurement result to the control section 61. The temperature detection section 65 measures temperature with the use of the temperature detection device 69, and outputs the measurement result to the control section 61. The temperature measurement result may be used for, for example, a case in which the control section 61 controls charge and discharge at the time of abnormal heat generation or a case in which the control section 61 performs a correction processing at the time of calculating a remaining capacity. The voltage detection section 66 measures a voltage of the secondary battery in the electric power source 62, performs analog-to-digital conversion on the measured voltage, and supplies the resultant to the control section 61.

The switch control section 67 controls operations of the switch section 63 according to signals inputted from the current measurement section 64 and the voltage measurement section 66.

The switch control section 67 executes control so that a charge current is prevented from flowing in a current path of the electric power source 62 by disconnecting the switch section 63 (charge control switch) in the case where, for example, a battery voltage reaches an overcharge detection voltage. Thereby, in the electric power source 62, only discharge is allowed to be performed through the discharging diode. It is to be noted that, for example, in the case where a large current flows at the time of charge, the switch control section 67 blocks the charge current.

Further, the switch control section 67 executes control so that a discharge current is prevented from flowing in the current path of the electric power source 62 by disconnecting the switch section 63 (discharge control switch) in the case where, for example, a battery voltage reaches an overdischarge detection voltage. Thereby, in the electric power source 62, only charge is allowed to be performed through the charging diode. For example, in the case where a large current flows at the time of discharge, the switch control section 67 blocks the discharge current.

It is to be noted that, in the secondary battery, for example, the overcharge detection voltage may be 4.20 V±0.05 V, and the over-discharge detection voltage may be 2.4 V±0.1 V.

The memory 68 may be, for example, an EEPROM as a nonvolatile memory, or the like. The memory 68 may store, for example, numerical values calculated by the control section 61 and information of the secondary battery measured in a manufacturing step (such as an internal resistance in the initial state). It is to be noted that, in the case where the memory 68 stores a full charge capacity of the secondary battery, the control section 61 is allowed to comprehend information such as a remaining capacity.

The temperature detection device 69 measures temperature of the electric power source 62, and outputs the measurement result to the control section 61. The temperature detection device 69 may be, for example, a thermistor or the like.

The cathode terminal 71 and the anode terminal 72 are terminals connected to an external device (such as a notebook personal computer) driven with the use of the battery pack or an external device (such as a battery charger) used for charging the battery pack. The electric power source 62 is charged and discharged through the cathode terminal 71 and the anode terminal 72.

[3-2. Electric Vehicle]

Figure 6:
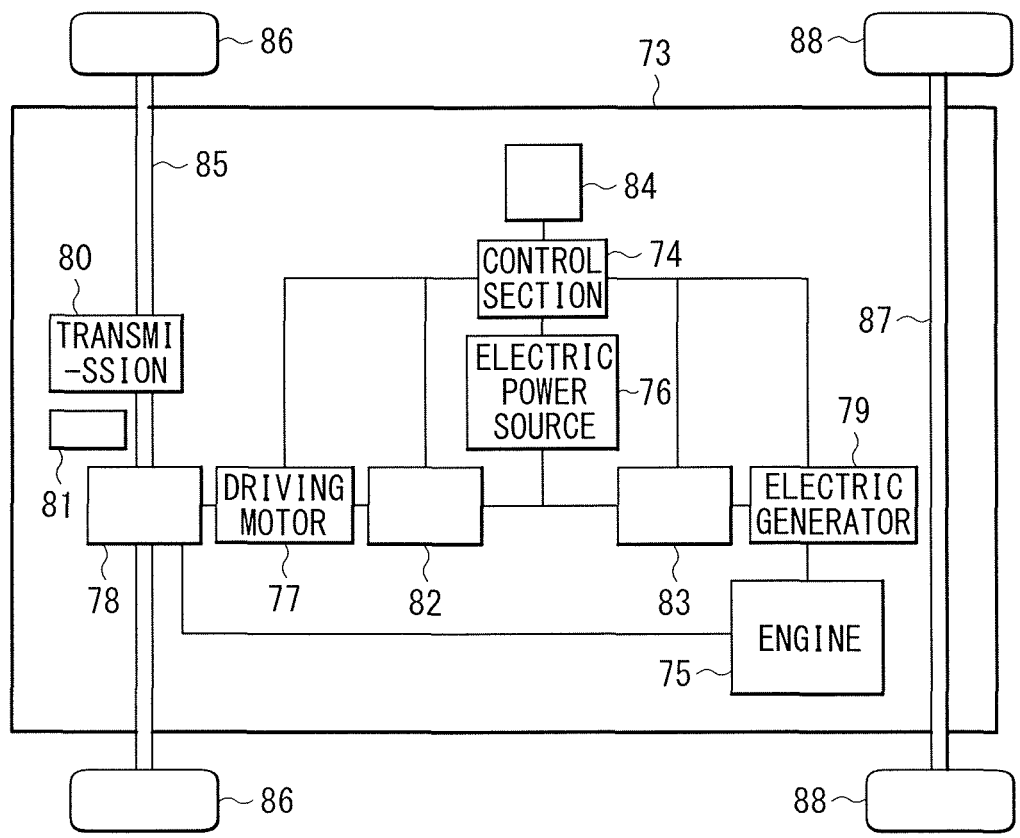
FIG. 6 is a block diagram illustrating a configuration of an application example (electric vehicle) of the secondary battery.

FIG. 6 illustrates a block configuration of a hybrid automobile as an example of electric vehicles. For example, the electric vehicle may include a control section 74, an engine 75, an electric power source 76, a driving motor 77, a differential 78, an electric generator 79, a transmission 80, a clutch 81, inverters 82 and 83, and various sensors 84 in a housing 73 made of metal. In addition thereto, the electric vehicle may include, for example, a front drive shaft 85 and a front tire 86 that are connected to the differential 78 and the transmission 80, a rear drive shaft 87, and a rear tire 88.

The electric vehicle may run with the use of, for example, for example, one of the engine 75 and the motor 77 as a drive source. The engine 75 is a main power source, and may be, for example, a petrol engine. In the case where the engine 75 is used as a power source, drive power (torque) of the engine 75 may be transferred to the front tire 86 or the rear tire 88 through the differential 78, the transmission 80, and the clutch 81 as drive sections, for example. The torque of the engine 75 may also be transferred to the electric generator 79. With the use of the torque, the electric generator 79 generates alternating-current electric power. The alternating-current electric power is converted into direct-current electric power through the inverter 83, and the converted power is stored in the electric power source 76. In contrast, in the case where the motor 77 as a conversion section is used as a power source, electric power (direct-current electric power) supplied from the electric power source 76 is converted into alternating-current electric power through the inverter 82. The motor 77 is driven with the use of the alternating-current electric power. Drive power (torque) obtained by converting the electric power by the motor 77 may be transferred to the front tire 86 or the rear tire 88 through the differential 78, the transmission 80, and the clutch 81 as the drive sections, for example.

It is to be noted that, alternatively, the following mechanism may be adopted. In the mechanism, when speed of the electric vehicle is reduced by an unillustrated brake mechanism, the resistance at the time of speed reduction is transferred to the motor 77 as torque, and the motor 77 generates alternating-current electric power by the torque. It may be preferable that the alternating-current electric power be converted to direct-current electric power through the inverter 82, and the direct-current regenerative electric power be stored in the electric power source 76.

The control section 74 controls operations of the whole electric vehicle, and, for example, may include a CPU and/or the like. The electric power source 76 includes one or more secondary batteries (not illustrated). Alternatively, the electric power source 76 may be connected to an external electric power source, and electric power may be stored by receiving the electric power from the external electric power source. The various sensors 84 may be used, for example, for controlling the number of revolutions of the engine 75 or for controlling opening level (throttle opening level) of an unillustrated throttle valve. The various sensors 84 may include, for example, a speed sensor, an acceleration sensor, an engine frequency sensor, and/or the like.

The description has been given above of the hybrid automobile as an electric vehicle. However, examples of the electric vehicles may include a vehicle (electric automobile) working with the use of only the electric power source 76 and the motor 77 without using the engine 75.

[3-3. Electric Power Storage System]

Figure 7:
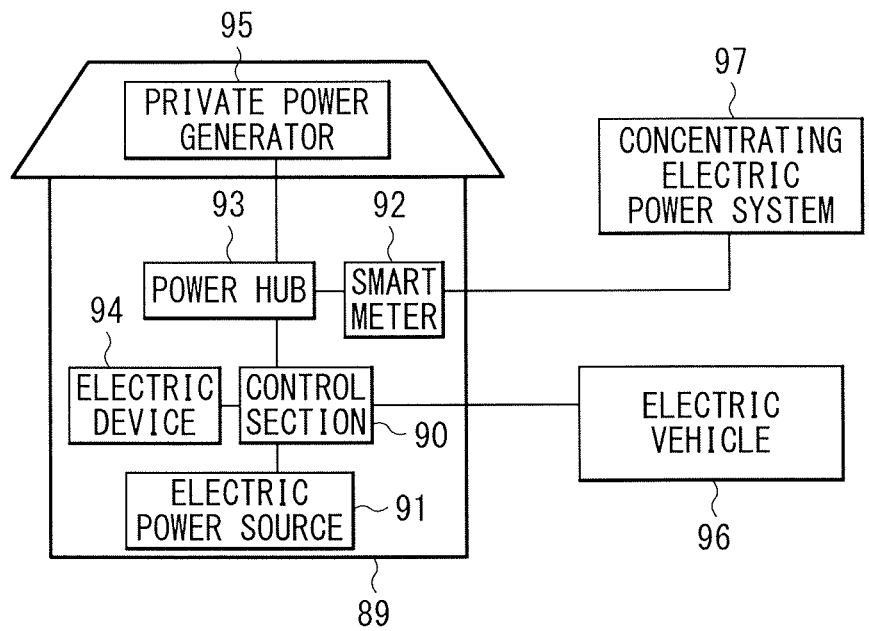
FIG. 7 is a block diagram illustrating a configuration of an application example (electric power storage system) of the secondary battery.

FIG. 7 illustrates a block configuration of an electric power storage system. For example, the electric power storage system may include a control section 90, an electric power source 91, a smart meter 92, and a power hub 93 inside a house 89 such as a general residence and a commercial building.

In this case, the electric power source 91 may be connected to, for example, an electric device 94 arranged inside the house 89, and may be connectable to an electric vehicle 96 parked outside the house 89. Further, for example, the electric power source 91 may be connected to a private power generator 95 arranged inside the house 89 through the power hub 93, and may be connectable to an external concentrating electric power system 97 through the smart meter 92 and the power hub 93.

It is to be noted that the electric device 94 may include, for example, one or more home electric appliances such as a refrigerator, an air conditioner, a television, and a water heater. The private power generator 95 may be, for example, one or more of a solar power generator, a wind-power generator, and the like. The electric vehicle 96 may be, for example, one or more of an electric automobile, an electric motorcycle, a hybrid automobile, and the like. The concentrating electric power system 97 may be, for example, one or more of a thermal power plant, an atomic power plant, a hydraulic power plant, a wind-power plant, and the like.

The control section 90 controls operation of the whole electric power storage system (including a used state of the electric power source 91), and, for example, may include a CPU and/or the like. The electric power source 91 includes one or more secondary batteries (not illustrated). The smart meter 92 may be, for example, an electric power meter compatible with a network arranged in the house 89 demanding electric power, and may be communicable with an electric power supplier. Accordingly, for example, while the smart meter 92 communicates with outside, the smart meter 92 controls the balance between supply and demand in the house 89, and thereby, allows effective and stable energy supply.

In the electric power storage system, for example, electric power may be stored in the electric power source 91 from the concentrating electric power system 97 as an external electric power source through the smart meter 92 and the power hub 93, and electric power is stored in the electric power source 91 from the private power generator 95 as an independent electric power source through the power hub 93. The electric power stored in the electric power source 91 is supplied to the electric device 94 or to the electric vehicle 96 according to an instruction of the control section 90. Therefore, the electric device 94 becomes operable, and the electric vehicle 96 becomes chargeable. That is, the electric power storage system is a system capable of storing and supplying electric power in the house 89 with the use of the electric power source 91.

The electric power stored in the electric power source 91 is arbitrarily usable. Therefore, for example, electric power is allowed to be stored in the electric power source 91 from the concentrating electric power system 97 in the middle of the night when an electric rate is inexpensive, and the electric power stored in the electric power source 91 is allowed to be used during daytime hours when an electric rate is expensive.

It is to be noted that the foregoing electric power storage system may be arranged for each household (family unit), or may be arranged for a plurality of households (family units).

[3-4. Electric Power Tool]

Figure 8:
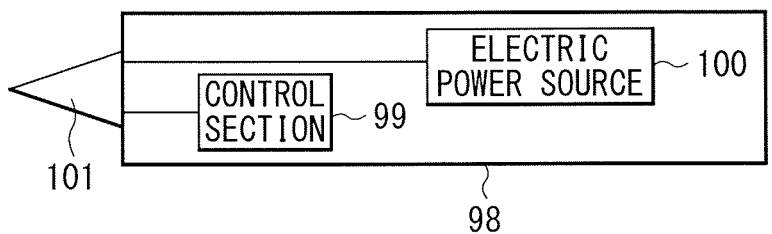
FIG. 8 is a block diagram illustrating a configuration of an application example (electric power tool) of the secondary battery.

FIG. 8 illustrates a block configuration of an electric power tool. For example, the electric power tool may be an electric drill, and may include a control section 99 and an electric power source 100 in a tool body 98 made of a plastic material and/or the like. For example, a drill section 101 as a movable section may be attached to the tool body 98 in an operable (rotatable) manner.

The control section 99 controls operations of the whole electric power tool (including a used state of the electric power source 100), and may include, for example, a CPU and/or the like. The electric power source 100 includes one or more secondary batteries (not illustrated). The control section 99 allows electric power to be supplied from the electric power source 100 to the drill section 101 according to operation of an unillustrated operation switch to operate the drill section 101.

EXAMPLES

Specific examples of the embodiment of the present application will be described in detail.

Examples 1 to 32

Synthesis of Anode Active Material

First, as an anode active material, lithium composite oxides ($Li_aCo_bMg_cZn_dNi_eSn_fO_4$) having the composition represented by Formula (3) were synthesized.

Upon synthesizing the lithium composite oxides, as raw materials, lithium hydroxide (LiOH), cobalt oxide (CoO), magnesium oxide (MgO), zinc oxide (ZnO), nickel oxide (NiO), and stannic oxide ($SnO_2$) were prepared. Thereafter, the raw materials were dry-blended. In this case, mixture ratios of the raw materials were adjusted so that the compositions of the lithium composite oxides that were finally obtained became desired compositions. Thereafter, the mixtures of the raw materials were fired in the air (at 1200 deg C. for 20 hours) to obtain the lithium composite oxides. The compositions (molar ratios a to f) of the lithium composite oxides were examined with the use of an ICP emission spectrometric analysis method, and results illustrated in Table 1 and Table 2 were obtained.

Diffraction patterns of crystal structures of the lithium composite oxides were examined with the use of an XRD method (specific X ray: CuKα ray). In any of the lithium composite oxides, eight diffraction peaks were detected. Detection positions of the respective diffraction peaks were about 17.8 deg, 29.2 deg, 34.4 deg, 36.0 deg, 41.8 deg, 45.8 deg, 51.8 deg, and 55.2 deg at diffraction angle of 2θ. The diffraction patterns corresponded with diffraction patterns of $CoMgSnO_4$, $CoZnSnO_4$, and $ZnNiSnO_4$ that were known reference materials (Sn-containing oxide) having spinel-type crystal structures Thereby, it was confirmed that the lithium composite oxides had spinel-type crystal structures.

[Fabrication of Secondary Battery]

Figure 9:
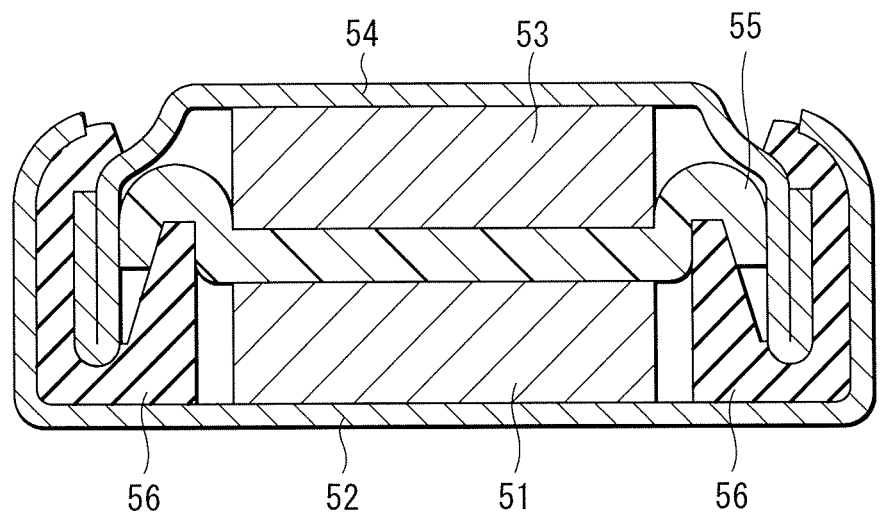
FIG. 9 is a cross-sectional view illustrating a configuration of a test-use secondary battery (coin type).

A test-use secondary battery (coin-type lithium ion secondary battery) illustrated in FIG. 9 was fabricated by the following procedure.

Upon fabricating a test electrode 51, 90 parts by mass of the anode active material (lithium composite oxide), 3 parts by mass of an anode binder (polyvinylidene fluoride), and 7 parts by mass of a cathode electric conductor (graphite) were mixed to obtain an anode mixture. In this case, for comparison, instead of the lithium composite oxide, lithium titanate ($Li_4Ti_5O_{12}$) and graphite (C) were used as well. Subsequently, the anode mixture was dispersed in an organic solvent (N-methyl-2-pyrrolidone) to obtain an anode mixture slurry. Subsequently, the anode mixture slurry was dried (at 120 deg C. for 2 hours) to volatilize the organic solvent. Subsequently, the dried material was pulverized with the use of a mortar to obtain an anode mixture powder. Finally, 0.1 g of the anode mixture powder was weighed. Thereafter, the anode mixture powder was pressure-molded into a disc-like shape with the use of an aluminum reticular body as a support to obtain a pellet-like anode mixture molded body (diameter: about 15.5 mm, thickness: about 250 μm).

As a counter electrode 53, a lithium metal plate (diameter: about 15.5 mm, thickness: 800 μm) molded into a disc-like shape (or in a pellet-like shape) was used.

Upon assembling the secondary battery, first, the test electrode 51 was contained in a package can 52, and the counter electrode 53 was contained in a package cup 54. Subsequently, the package can 52 and the package cup 54 were layered with a separator 55 (a microporous polyethylene film being 25 μm thick) impregnated with an electrolytic solution in between so that the test electrode 51 is opposed to the counter electrode 53. The electrolytic solution is obtained by dissolving an electrolyte salt ($LiPF_6$) in a solvent (ethylene carbonate and dimethyl carbonate). The composition of the solvent (volume ratio) was ethylene carbonate:dimethyl carbonate=50:50. The contained amount of the electrolyte salt was 1 mol/kg with respect to the solvent. Finally, the package can 52 and the package cup 54 were swaged with a gasket 56 (polypropylene film). Thereby, the coin-type secondary battery (outer shape: about 20 mm, height: about 1.6 mm) was completed.

[Measurement of Battery Characteristics]

As battery characteristics of the secondary battery, capacity characteristics and safety thereof were examined. Results illustrated in Table 1 and Table 2 were obtained.

In examining the capacity characteristics, two cycles of charge and discharge were performed on the secondary battery in the ambient temperature environment (23 deg C.) to measure a discharge capacity at the second cycle. Thereafter, (discharge capacity (mAh/g) of two cycles)=(discharge capacity (mAh) at the second cycle)/(mass (g) of anode active material) was obtained. Subsequently, the secondary battery was repeatedly charged and discharged until the total number of cycles reached 100 in the same environment, and a discharge capacity at the 100th cycle was measured. Thereafter, (discharge capacity (mAh/g) of 100 cycles)=(discharge capacity (mAh) at the 100th cycle)/(mass (g) of anode active material) was obtained. At the time of charge, constant-current-constant-voltage charge was performed at a charging current of 0.2 mA and a lower limit voltage of 0.7 V until the minimum current reached 0.002 mA. At the time of discharge, constant-current discharge was performed at a discharging current of 0.2 mA and an upper limit voltage of 2 V.

In examining the safety, after the secondary battery was charged, the secondary battery in a state of being charged was disassembled, and the pellet-like anode mixture molded body was taken out from the test electrode 51. At the time of charge, constant-current-constant-voltagecharge was performed at a charging current of 0.2 mA and a lower limit voltage of 0 V until the minimum current reached 0.002 mA. Thereafter, with the use of the anode mixture molded body taken out, differential scanning calorimetry (DSC) was performed under existence of the electrolytic solution. Thereby, (calorific value (W/g))=(heat quantity (W))/(mass (g) of anode active material) was obtained.

TABLE 1

| Example | Lithium composite oxide ($Li_aCo_bMg_cZn_dNi_eSn_fO_4$) | | | | | | Discharge capacity of two cycles (mAh/g) | Discharge capacity of 100 cycles (mAh/g) | Calorific value (W/g) |
|---|---|---|---|---|---|---|---|---|---|
| | a | b | c | d | e | f | | | |
| 1 | 0.3 | 0.1 | 0.3 | 0.5 | 1.0 | 0.8 | 189 | 186 | — |
| 2 | 0.3 | 0.2 | 0.2 | 0.7 | 0.8 | 0.8 | 191 | 191 | — |
| 3 | 0.3 | 0.5 | 0 | 0.9 | 0.5 | 0.8 | 190 | 189 | — |
| 4 | 0.5 | 0 | 0.2 | 0.5 | 1.0 | 0.8 | 199 | 197 | — |
| 5 | 0.5 | 0.3 | 0.1 | 0.8 | 0.5 | 0.8 | 202 | 200 | 1.04 |
| 6 | 0.7 | 0.1 | 0.1 | 0.4 | 0.9 | 0.8 | 198 | 195 | — |
| 7 | 0.7 | 0.5 | 0 | 0.6 | 0.4 | 0.8 | 199 | 196 | — |
| 8 | 1.0 | 0.1 | 0.2 | 0.3 | 0.6 | 0.8 | 195 | 193 | — |
| 9 | 1.0 | 0.2 | 0.1 | 0.4 | 0.5 | 0.8 | 196 | 193 | — |
| 10 | 1.0 | 0.3 | 0 | 0.6 | 0.3 | 0.8 | 195 | 192 | — |
| 11 | 0.3 | 0.1 | 0.2 | 0.4 | 1.0 | 1.0 | 189 | 187 | — |
| 12 | 0.3 | 0.2 | 0.1 | 0.6 | 0.8 | 1.0 | 193 | 191 | — |
| 13 | 0.3 | 0.4 | 0 | 0.8 | 0.5 | 1.0 | 187 | 185 | — |
| 14 | 0.5 | 0 | 0.2 | 0.3 | 1.0 | 1.0 | 202 | 202 | — |
| 15 | 0.5 | 0.3 | 0 | 0.7 | 0.5 | 1.0 | 199 | 198 | — |
| 16 | 0.7 | 0 | 0.1 | 0.3 | 0.9 | 1.0 | 201 | 201 | — |
| 17 | 0.7 | 0.3 | 0 | 0.6 | 0.4 | 1.0 | 198 | 198 | — |
| 18 | 1.0 | 0 | 0.1 | 0.3 | 0.6 | 1.0 | 195 | 193 | — |
| 19 | 1.0 | 0.1 | 0.1 | 0.3 | 0.5 | 1.0 | 195 | 190 | — |
| 20 | 1.0 | 0.2 | 0 | 0.5 | 0.3 | 1.0 | 196 | 192 | — |

TABLE 2

| Example | Lithium composite oxide ($Li_aCo_bMg_cZn_dNi_eSn_fO_4$) | | | | | | Discharge capacity of two cycles (mAh/g) | Discharge capacity of 100 cycles (mAh/g) | Calorific value (W/g) |
|---|---|---|---|---|---|---|---|---|---|
| | a | b | c | d | e | f | | | |
| 21 | 0.3 | 0.1 | 0.1 | 0.3 | 1.0 | 1.2 | 189 | 189 | — |
| 22 | 0.3 | 0.2 | 0 | 0.5 | 0.8 | 1.2 | 187 | 187 | — |
| 23 | 0.3 | 0.3 | 0 | 0.7 | 0.5 | 1.2 | 192 | 190 | — |
| 24 | 0.5 | 0 | 0.1 | 0.3 | 0.9 | 1.2 | 202 | 202 | — |
| 25 | 0.5 | 0.3 | 0 | 0.6 | 0.4 | 1.2 | 199 | 199 | — |
| 26 | 0.7 | 0.1 | 0 | 0.3 | 0.7 | 1.2 | 200 | 197 | — |
| 27 | 0.7 | 0.3 | 0 | 0.5 | 0.3 | 1.2 | 201 | 201 | — |
| 28 | 1.0 | 0 | 0.1 | 0.3 | 0.4 | 1.2 | 195 | 194 | — |
| 29 | 1.0 | 0.1 | 0.1 | 0.3 | 0.3 | 1.2 | 195 | 195 | — |
| 30 | 1.0 | 0.3 | 0 | 0.4 | 0.1 | 1.2 | 196 | 193 | — |
| 31 | $Li_4Ti_5O_{12}$ | | | | | | 169 | 167 | 0.85 |
| 32 | C | | | | | | — | — | 7.85 |

The battery characteristics were largely changed according to types of the anode active materials.

More specifically, in the case where any of the lithium composite oxides ($Li_aCo_bMgcZn_dNi_eSn_fO_4$) was used, both the discharge capacity of two cycles and the discharge capacity of 100 cycles were increased compared to in the case of using lithium titanate ($Li_4Ti_5O_{12}$). In addition thereto, in the case of using any of the lithium composite oxides, the calorific value was largely decreased compared to in the case of using graphite (C). The calorific value generated in the case of using the lithium composite oxide was nearly the same as that in the case of using lithium titanate.

The foregoing result shows the following facts. First, charge-discharge electric potential of a lithium composite oxide is sufficiently lower than charge-discharge electric potential of lithium titanate. Therefore, high energy density is obtained with the use of the lithium composite oxide as an anode active material. Thereby, in a secondary battery using the lithium composite oxide, both a discharge capacity of two cycles and a discharge capacity of 100 cycles are increased. Secondly, as described above, the charge-discharge electric potential of the lithium composite oxide is sufficiently low compared to the charge-discharge electric potential of lithium titanate. However, the charge-discharge electric potential of the lithium composite oxide is still sufficiently high compared to charge-discharge electric potential of a carbon material such as graphite, and therefore, in the case of using the lithium composite oxide, lithium metal is less likely to be precipitated at the time of charge and discharge. Thereby, in a secondary battery using the lithium composite oxide, a calorific value is allowed to be suppressed to the degree substantially equal to that in the case of using lithium titanate.

When the secondary battery was charged and discharged two cycles in order to obtain the foregoing discharge capacity of two cycles, a relation between the discharge capacity (mAh/g) and the operating voltage (V) at the time of charge and discharge at the second cycle was examined.

Figure 10:
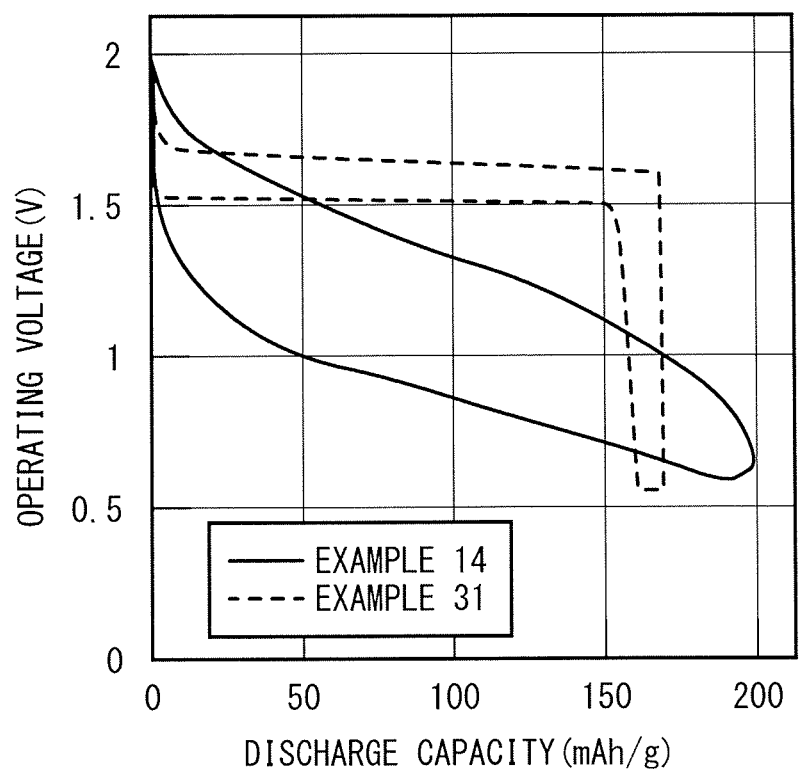
FIG. 10 is charge-discharge curves of secondary batteries.

FIG. 10 illustrates charge-discharge curves of secondary batteries of Examples 14 and 31 as representatives for the secondary batteries. As seen in the charge and discharge curves, in the case of using lithium titanate, a charge-discharge reaction substantially proceeded at a high operating voltage around 1.5 V. In contrast, in the case of using the lithium composite oxide, a charge-discharge reaction substantially proceeded at a low operating voltage around 1 V. From the foregoing result, it was proven that the charge-discharge electric potential of the lithium composite oxide was sufficiently lower than the charge-discharge electric potential of lithium titanate.

Examples 33 to 42

Secondary batteries were fabricated in a procedure similar to that of Example 11 except that the lithium composite oxide ($Li_aCo_bMg_cZn_dNi_eSn_fX_gO_4$) represented by Formula (2) was used as an anode active material, and capacity characteristics were examined. Results illustrated in Table 3 were obtained. It is to be noted that, upon synthesizing the lithium composite oxides, various oxides (oxides of other element X) such as calcium oxide (CaO) and aluminum oxide ($Al_2O_3$) were used as raw materials. Analytical results of compositions (molar ratios a to g) of the lithium composite oxides using an ICP emission spectrometry method were as illustrated in Table 3.

TABLE 3

| | Lithium composite oxide ($Li_aCo_bMg_cZn_dNi_eSn_fX_gO_4$) | | | | | | | Discharge capacity of two cycles (mAh/g) | Discharge capacity of 100 cycles (mAh/g) |
|---|---|---|---|---|---|---|---|---|---|
| Example | a | b | c | d | e | f | g | | |
| 33 | 0.3 | 0.1 | 0.2 | 0.4 | 1.0 | 0.96 | Ca = 0.04 | 191 | 189 |
| 34 | 0.3 | 0.1 | 0.2 | 0.4 | 1.0 | 0.96 | Al = 0.04 | 193 | 191 |
| 35 | 0.3 | 0.1 | 0.2 | 0.4 | 1.0 | 0.99 | Ti = 0.01 | 193 | 192 |
| 36 | 0.3 | 0.1 | 0.2 | 0.4 | 1.0 | 0.95 | V = 0.05 | 192 | 190 |
| 37 | 0.3 | 0.1 | 0.2 | 0.4 | 1.0 | 0.95 | Cr = 0.05 | 190 | 188 |
| 38 | 0.3 | 0.1 | 0.2 | 0.4 | 1.0 | 0.97 | Mn = 0.03 | 192 | 190 |
| 39 | 0.3 | 0.1 | 0.2 | 0.4 | 1.0 | 0.96 | Fe = 0.04 | 194 | 193 |
| 40 | 0.3 | 0.1 | 0.2 | 0.4 | 1.0 | 0.95 | Ca = 0.02 Mn = 0.03 | 192 | 189 |
| 41 | 0.3 | 0.1 | 0.2 | 0.4 | 1.0 | 0.95 | Al = 0.01 Ti = 0.04 | 194 | 192 |
| 42 | 0.3 | 0.1 | 0.2 | 0.4 | 1.0 | 0.95 | Ti = 0.02 V = 0.02 Fe = 0.01 | 192 | 190 |

In the case where the lithium composite oxide contained other element X as a constitutional element, both the discharge capacity of two cycles and the discharge capacity of 100 cycles were increased compared to in the case where the lithium composite oxide did not contain other element X.

From the results of Table 1 to Table 3 and FIG. 10, in the case where the lithium composite oxide as an anode active material had the composition represented by Formula (1), a high discharge capacity is obtained, and the calorific value was kept low. Therefore, it was confirmed that, in this case, both the capacity characteristics and the safety were achievable.

The present application has been described above referring to the preferred embodiment and Examples. However, the present application is not limited to the examples described in the preferred embodiment and Examples, and may be variously modified. For example, the description has been given with the specific examples of the case in which the battery structure is the cylindrical type or the laminated film type, and the battery device has the spirally wound structure. However, applicable structures are not limited thereto. The secondary battery of the present application is similarly applicable to a battery having other battery structure such as a square-type battery, a coin-type battery, and a button-type battery, or a battery in which the battery device has other structure such as a laminated structure.

Further, the active material and the electrode of the present application may be applied not only to a secondary battery, but also to other electrochemical devices. Examples of other electrochemical devices may include a capacitor.

Further, the description has been given of the appropriate ranges derived from the results of Examples for the molar ratios a to g of the respective constitutional elements of the lithium composite oxides represented by Formula (1) and Formula (2). However, the description does not totally deny a possibility that the molar ratio ranges become out of the foregoing ranges. That is, the foregoing appropriate ranges are particularly preferable ranges to obtain the effect of the present application. Therefore, as long as the effect of the present application is obtainable, the molar ratio ranges may be out of the foregoing molar ratio ranges in some degree.

It is possible to achieve at least the following configurations from the above-described example embodiment and the modifications of the disclosure.

(1) A secondary battery including:
a cathode;
an anode; and
an electrolytic solution, wherein
the anode includes a lithium composite oxide represented by following Formula (1),

$$\mathrm{Li}_w\mathrm{Zn}_x\mathrm{Sn}_y\mathrm{M}_z\mathrm{O}_4 \qquad (1)$$

where M is one or more of Co, Mg, Ni, Ca, Al, Ti, V, Cr, Mn, Fe, Cu, and Ag; and w to z satisfy $0.3 \le w \le 1$, $0.3 \le x \le 1$, $0.8 \le y \le 1.2$, and $(w+x+y+z)=3$.

(2) The secondary battery according to (1), wherein the lithium composite oxide is represented by following Formula (2),

$$\mathrm{Li}_a\mathrm{Co}_b\mathrm{Mg}_c\mathrm{Zn}_d\mathrm{Ni}_e\mathrm{Sn}_f\mathrm{X}_g\mathrm{O}_4 \qquad (2)$$

where X is one or more of Ca, Al, Ti, V, Cr, Mn, Fe, Cu, and Ag; and a to g satisfy $0.3 \le a \le 1$, $0 \le b \le 1$, $0 \le c \le 1$, $0.3 \le d \le 1$, $0 \le e \le 1$, $0.8 \le f \le 1.2$, $0 \le g \le 0.05$, $(a+b+c+d+e+f+g)=3$, and $(c+d+g) \le 1.3$.

(3) The secondary battery according to (2), wherein the lithium composite oxide is represented by following Formula (3),

$$\mathrm{Li}_a\mathrm{Co}_b\mathrm{Mg}_c\mathrm{Zn}_d\mathrm{Ni}_e\mathrm{Sn}_f\mathrm{O}_4 \qquad (3)$$

where a to f satisfy $0.3 \le a \le 1$, $0 \le b \le 1$, $0 \le c \le 1$, $0.3 \le d \le 1$, $0 \le e \le 1$, $0.8 \le f \le 1.2$, $(a+b+c+d+e+f)=3$, and $(c+d) \le 1.3$.

(4) The secondary battery according to any one of (1) to (3), wherein the secondary battery is a lithium ion secondary battery.

(5) An electrode including
a lithium composite oxide represented by following Formula (1),

$$\mathrm{Li}_w\mathrm{Zn}_x\mathrm{Sn}_y\mathrm{M}_z\mathrm{O}_4 \qquad (1)$$

where M is one or more of Co, Mg, Ni, Ca, Al, Ti, V, Cr, Mn, Fe, Cu, and Ag; and w to z satisfy $0.3 \le w \le 1$, $0.3 \le x \le 1$, $0.8 \le y \le 1.2$, and $(w+x+y+z)=3$.

(6) An active material including
a lithium composite oxide represented by following Formula (1),

$$\mathrm{Li}_w\mathrm{Zn}_x\mathrm{Sn}_y\mathrm{M}_z\mathrm{O}_4 \qquad (1)$$

where M is one or more of Co, Mg, Ni, Ca, Al, Ti, V, Cr, Mn, Fe, Cu, and Ag; and w to z satisfy $0.3 \le w \le 1$, $0.3 \le x \le 1$, $0.8 \le y \le 1.2$, and $(w+x+y+z)=3$.

(7) A battery pack including:
the secondary battery according to any one of (1) to (4);
a control section configured to control operation of the secondary battery; and a switch section configured to switch the operation of the secondary battery according to an instruction of the control section.

(8) An electric vehicle including:
the secondary battery according to any one of (1) to (4);
a conversion section configured to convert electric power supplied from the secondary battery into drive power;
a drive section configured to operate according to the drive power; and
a control section configured to control operation of the secondary battery.

(9) An electric power storage system including:
the secondary battery according to any one of (1) to (4);
one or more electric devices configured to be supplied with electric power from the secondary battery; and
a control section configured to control the supplying of the electric power from the secondary battery to the one or more electric devices.

(10) An electric power tool including:
the secondary battery according to any one of (1) to (4); and
a movable section configured to be supplied with electric power from the secondary battery.

(11) An electronic apparatus comprising
the secondary battery according to any one of (1) to (4) as an electric power supply source.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A secondary battery comprising:
a cathode;
an anode; and
an electrolytic solution, wherein
the anode includes a lithium composite oxide represented by following Formula (1),

$$\mathrm{Li}_w\mathrm{Zn}_x\mathrm{Sn}_y\mathrm{M}_z\mathrm{O}_4 \qquad (1)$$

where M is one or more of Co, Mg, Ni, Ca, Al, Ti, V, Cr, Mn, Fe, Cu, and Ag; and w to z satisfy $0.3 \le w \le 1$, $0.3 \le x \le 1$, $0.8 \le y \le 1.2$, and $(w+x+y+z)=3$.

2. The secondary battery according to claim 1, wherein the lithium composite oxide is represented by following Formula (2),

$$\mathrm{Li}_a\mathrm{Co}_b\mathrm{Mg}_c\mathrm{Zn}_d\mathrm{Ni}_e\mathrm{Sn}_f\mathrm{X}_g\mathrm{O}_4 \qquad (2)$$

where X is one or more of Ca, Al, Ti, V, Cr, Mn, Fe, Cu, and Ag; and a to g satisfy $0.3 \le a \le 1$, $0 \le b \le 1$, $0 \le c \le 1$, $0.3 \le d \le 1$, $0 \le e \le 1$, $0.8 \le f \le 1.2$, $0 \le g \le 0.05$, $(a+b+c+d+e+f+g)=3$, and $(c+d+g) \le 1.3$.

3. The secondary battery according to claim 2, wherein the lithium composite oxide is represented by following Formula (3),

$$\mathrm{Li}_a\mathrm{Co}_b\mathrm{Mg}_c\mathrm{Zn}_d\mathrm{Ni}_e\mathrm{Sn}_f\mathrm{O}_4 \qquad (3)$$

where a to f satisfy $0.3 \le a \le 1$, $0 \le b \le 1$, $0 \le c \le 1$, $0.3 \le d \le 1$, $0 \le e \le 1$, $0.8 \le f \le 1.2$, $(a+b+c+d+e+f)=3$, and $(c+d) \le 1.3$.

4. The secondary battery according to claim 1, wherein the secondary battery is a lithium ion secondary battery.

5. An electrode comprising
a lithium composite oxide represented by following Formula (1),

$$\mathrm{Li}_w\mathrm{Zn}_x\mathrm{Sn}_y\mathrm{M}_z\mathrm{O}_4 \qquad (1)$$

where M is one or more of Co, Mg, Ni, Ca, Al, Ti, V, Cr, Mn, Fe, Cu, and Ag; and w to z satisfy $0.3 \leq w \leq 1$, $0.3 \leq x \leq 1$, $0.8 \leq y \leq 1.2$, and $(w+x+y+z)=3$.

6. An active material comprising
a lithium composite oxide represented by following Formula (1), $$Li_wZn_xSn_yM_zO_4 \qquad (1)$$

where M is one or more of Co, Mg, Ni, Ca, Al, Ti, V, Cr, Mn, Fe, Cu, and Ag; and w to z satisfy $0.3 \leq w \leq 1$, $0.3 \leq x \leq 1$, $0.8 \leq y \leq 1.2$, and $(w+x+y+z)=3$.

7. A battery pack comprising:
a secondary battery;
a control section configured to control operation of the secondary battery; and
a switch section configured to switch the operation of the secondary battery according to an instruction of the control section, wherein
the secondary battery includes
a cathode,
an anode, and
an electrolytic solution, and
the anode includes a lithium composite oxide represented by following Formula (1), $$Li_wZn_xSn_yM_zO_4 \qquad (1)$$

where M is one or more of Co, Mg, Ni, Ca, Al, Ti, V, Cr, Mn, Fe, Cu, and Ag; and w to z satisfy $0.3 \leq w \leq 1$, $0.3 \leq x \leq 1$, $0.8 \leq y \leq 1.2$, and $(w+x+y+z)=3$.

8. An electric vehicle comprising:
a secondary battery;
a conversion section configured to convert electric power supplied from the secondary battery into drive power;
a drive section configured to operate according to the drive power; and
a control section configured to control operation of the secondary battery, wherein
the secondary battery includes
a cathode,
an anode, and
an electrolytic solution, and
the anode includes a lithium composite oxide represented by following Formula (1), $$Li_wZn_xSn_yM_zO_4 \qquad (1)$$

where M is one or more of Co, Mg, Ni, Ca, Al, Ti, V, Cr, Mn, Fe, Cu, and Ag; and w to z satisfy $0.3 \leq w \leq 1$, $0.3 \leq x \leq 1$, $0.8 \leq y \leq 1.2$, and $(w+x+y+z)=3$.

9. An electric power storage system comprising:
a secondary battery;
one or more electric devices configured to be supplied with electric power from the secondary battery; and
a control section configured to control the supplying of the electric power from the secondary battery to the one or more electric devices, wherein
the secondary battery includes
a cathode,
an anode, and
an electrolytic solution, and
the anode includes a lithium composite oxide represented by following Formula (1), $$Li_wZn_xSn_yM_zO_4 \qquad (1)$$

where M is one or more of Co, Mg, Ni, Ca, Al, Ti, V, Cr, Mn, Fe, Cu, and Ag; and w to z satisfy $0.3 \leq w \leq 1$, $0.3 \leq x \leq 1$, $0.8 \leq y \leq 1.2$, and $(w+x+y+z)=3$.

10. An electric power tool comprising:
a secondary battery; and
a movable section configured to be supplied with electric power from the secondary battery, wherein
the secondary battery includes
a cathode,
an anode, and
an electrolytic solution, and
the anode includes a lithium composite oxide represented by following Formula (1), $$Li_wZn_xSn_yM_zO_4 \qquad (1)$$

where M is one or more of Co, Mg, Ni, Ca, Al, Ti, V, Cr, Mn, Fe, Cu, and Ag; and w to z satisfy $0.3 \leq w \leq 1$, $0.3 \leq x \leq 1$, $0.8 \leq y \leq 1.2$, and $(w+x+y+z)=3$.

11. An electronic apparatus comprising
a secondary battery as an electric power supply source, wherein
the secondary battery includes
a cathode,
an anode, and
an electrolytic solution, and
the anode includes a lithium composite oxide represented by following Formula (1), $$Li_wZn_xSn_yM_zO_4 \qquad (1)$$

where M is one or more of Co, Mg, Ni, Ca, Al, Ti, V, Cr, Mn, Fe, Cu, and Ag; and w to z satisfy $0.3 \leq w \leq 1$, $0.3 \leq x \leq 1$, $0.8 \leq y \leq 1.2$, and $(w+x+y+z)=3$.

* * * * *